(12) United States Patent
Bangura et al.

(10) Patent No.: US 9,647,582 B2
(45) Date of Patent: *May 9, 2017

(54) INDUCTION MOTOR-PERMANENT MAGNET GENERATOR TANDEM CONFIGURATION STARTER-GENERATOR FOR HYBRID VEHICLES

(71) Applicant: Altigreen Propulsion Labs Private Limited, Bengaluru (IN)

(72) Inventors: John Bangura, Rockton, IL (US); Lasse Moklegaard, Waverly, IA (US); Amitabh Saran, New Delhi (IN)

(73) Assignee: Altigreen Propulsion Labs Private Limited, Bengaluru (IN)

( * ) Notice: Subject to any disclaimer, the term of this patent is extended or adjusted under 35 U.S.C. 154(b) by 0 days.

This patent is subject to a terminal disclaimer.

(21) Appl. No.: 15/214,337

(22) Filed: Jul. 19, 2016

(65) Prior Publication Data

US 2016/0329842 A1    Nov. 10, 2016

Related U.S. Application Data

(63) Continuation of application No. 13/935,505, filed on Jul. 4, 2013, now Pat. No. 9,441,599.

(Continued)

(51) Int. Cl.
*F16H 48/30* (2012.01)
*H02P 5/74* (2006.01)
(Continued)

(52) U.S. Cl.
CPC ............... *H02P 5/74* (2013.01); *B60K 6/445* (2013.01); *B60W 20/10* (2013.01);
(Continued)

(58) Field of Classification Search
CPC .. F02N 11/04; F02N 11/006; F02N 2300/202; B60K 6/445; B60W 20/10
See application file for complete search history.

(56) References Cited

U.S. PATENT DOCUMENTS 4,476,395 A    10/1984  Cronin
4,572,961 A    2/1986   Borger
(Continued)

FOREIGN PATENT DOCUMENTS

WO    2011106944    9/2011

*Primary Examiner* — David J Hlavka
(74) *Attorney, Agent, or Firm* — Schwabe, Williamson & Wyatt P.C.

(57) ABSTRACT

Disclosed in the present invention is a tandem starter-generator construction that includes an induction motor-generator, a permanent magnet motor-generator and power transmission unit disposed adjacent to the motor-generators. The induction motor-generator is utilized predominantly as a motor to provide mechanical power at relatively high efficiency as a motor, and as a generator to provide electrical power during regenerative braking. The permanent magnet motor-generator is used predominantly as a generator for very high efficiency power conversion and to capture additional electrical power during regenerative braking to compensates for the regenerative energy captured at lower efficiency by the induction motor-generator. Accordingly, the tandem motor-generator construction disclosed herein overcomes the drawbacks of low efficiency of an induction motor-generator operating in regenerative mode and a permanent magnet motor-generator magnetic drag losses during periods of non-utilization at high speeds in order to improve fuel efficiency of a parallel hybrid vehicle.

20 Claims, 9 Drawing Sheets

Related U.S. Application Data

(60) Provisional application No. 61/672,296, filed on Jul. 17, 2012.

(51) Int. Cl.
    *F02N 11/00*     (2006.01)
    *B60W 20/10*     (2016.01)
    *B60K 6/445*     (2007.10)
    *F02N 11/04*     (2006.01)
    *F02N 15/08*     (2006.01)

(52) U.S. Cl.
    CPC ............ *F02N 11/006* (2013.01); *F02N 11/04* (2013.01); *F02N 15/08* (2013.01); *F02N 2300/2002* (2013.01); *Y10S 903/906* (2013.01); *Y10T 74/137* (2015.01); *Y10T 477/23* (2015.01)

(56) References Cited

U.S. PATENT DOCUMENTS

| | | | |
|---|---|---|---|
| 4,663,581 A | 5/1987 | Glennon | |
| 4,691,119 A | 9/1987 | McCabria | |
| 4,879,484 A | 11/1989 | Huss | |
| 5,300,848 A | 4/1994 | Huss | |
| 5,382,858 A | 1/1995 | Sugiyama | |
| 5,943,918 A | 8/1999 | Reed | |
| 5,967,940 A | 10/1999 | Yamaguchi | |
| 6,278,195 B1 | 8/2001 | Yamaguchi | |
| 6,281,660 B1 | 8/2001 | Abe | |
| 6,462,430 B1 | 10/2002 | Joong | |
| 6,700,268 B2 | 3/2004 | Joong | |
| 7,389,837 B2 | 6/2008 | Tamai | |
| 7,404,460 B2 * | 7/2008 | Oshidari | B60K 6/26 180/344 |
| 7,753,147 B2 | 7/2010 | Usoro | |
| 7,914,416 B2 | 3/2011 | Maguire | |
| 8,225,608 B2 | 7/2012 | Wu | |
| 8,360,181 B2 | 1/2013 | Wei | |
| 8,412,396 B2 | 4/2013 | Swales | |
| 8,475,311 B2 | 7/2013 | Ren | |
| 8,517,880 B2 | 8/2013 | Hoshino | |
| 8,798,837 B2 * | 8/2014 | Kanayama | B60K 6/442 701/22 |
| 2004/0040810 A1 | 3/2004 | Notsu | |
| 2004/0146419 A1 | 7/2004 | Kawaguchi | |
| 2005/0107198 A1 | 5/2005 | Sowul | |
| 2006/0019786 A1 | 1/2006 | Asa | |
| 2006/0263203 A1 | 11/2006 | Barker | |
| 2007/0049455 A1 | 3/2007 | Kuramochi | |
| 2008/0227592 A1 * | 9/2008 | Steffen | B60K 6/365 477/19 |
| 2009/0001843 A1 | 1/2009 | Enomoto | |
| 2011/0040432 A1 * | 2/2011 | Kaltenbach | B60K 6/365 701/22 |
| 2011/0160019 A1 | 6/2011 | Harada | |
| 2012/0065015 A1 | 3/2012 | Tamai | |
| 2012/0277059 A1 | 11/2012 | Akutsu | |
| 2013/0005529 A1 | 1/2013 | Chen | |
| 2014/0024490 A1 | 1/2014 | Bangura | |

* cited by examiner

INDUCTION MOTOR-PERMANENT MAGNET GENERATOR TANDEM CONFIGURATION STARTER-GENERATOR FOR HYBRID VEHICLES

CROSS-REFERENCE TO RELATED APPLICATIONS

This application is a continuation of and claims priority benefit of U.S. patent application Ser. No. 13/935,505, filed on Jul. 4, 2013, which is a non-provisional of and claims priority benefit of U.S. provisional application No. 61/741,763, filed on Jul. 17, 2012, all of which are incorporated by reference herein in their entirety.

TECHNICAL FIELD

The present invention relates to the art of power generation in hybrid vehicles. More particularly, the description pertains to a combination induction motor-permanent magnet generator configuration which is compact in construction and suitable for a belt-driven power-assist parallel hybrid vehicle.

BACKGROUND OF THE INVENTION

Generally, a belt-driven power-assist parallel hybrid vehicle designates a vehicle configured wherein the mechanical power transmitted to a drivetrain is generated by both an engine and an electric motor in order to maximize fuel economy. The electric motors used in these hybrid vehicles are typically of the squirrel-cage induction and permanent magnet types.

One of the attractive features of using a permanent motor in a belt-driven parallel hybrid vehicle as a secondary source of propulsion is that it offers high efficiency during periods of utilization in low speed urban or city driving that offsets its magnetic drag losses due to the rotating permanent magnets during periods of non-utilization. However, during moderate to high speeds in a drive cycle wherein the permanent magnet motor is not being utilized, the rotating magnetic drag losses increase the resistance of the drivetrain that grossly exceeds the benefits of high efficiency, and as a consequence reduced fuel efficiency is achieved.

Therefore, one disadvantage of utilizing a permanent magnet motor in a belt-driven power-assist parallel hybrid vehicle is that it adds unnecessary magnetic drag losses to the drivetrain during periods of the drive cycle when is not being utilized. Thus, it is not desirable in a belt-driven power-assist parallel hybrid vehicle where electric motor utilization is low. In addition, the additional magnetic drag losses due to the rotating permanent magnets are converted into heat that require increased heat rejection capability of the cooling system in the vehicle.

On the other hand, using an induction motor as a secondary source of propulsion in a belt-driven power-assist parallel hybrid vehicle eliminates the rotating magnetic drag losses that inherently exist in permanent magnet motors, and this can result in improvement in fuel efficiency. Induction motors are desirable for many traction applications due to their unique smooth torque-speed characteristics as well as capability to handle high-to-low and low-to-high torque transitions smoothly. Induction motors have a unique performance advantage over permanent magnet motors in terms of transient overload capability. That is, for a given current higher transient overload torque and power capability can be achieved with an induction motor since its torque is a function of the square of the available current than a permanent magnet motor whose torque is a function of current. Short transient overload capability is an important requirement that an electric motor must meet in a hybrid vehicle application as a secondary source of propulsion. This capability combined with careful design, cost, ruggedness and reliability are some of the reasons induction motors are utilized extensively in traction applications to provide high torque at relatively high efficiency. In addition to their primary use as motors, they may be used as generators which may be operated to apply regenerative brake to a hybrid vehicle as needed for conversion of mechanical energy extracted during braking or deceleration to electrical power for charging the onboard electric energy storage device.

However, utilizing an induction motor in regenerative mode as a generator to provide electrical power is not one of its strong features. The disadvantage is due to the fact that in generate mode an induction motor operates with a lagging power factor, and therefore consumes reactive power that must be supplied to magnetized its magnetic circuit for proper operation. As a result, induction motors have lower efficiency when operated in generator mode than motor mode.

Improving the fuel efficiency of a hybrid vehicle throughout its drive cycle requires: (1) that the electric energy supplied by the onboard electric energy storage device during motoring mode must be efficiently converted to mechanical power to provide torque- and power-assist to the drivetrain and wheels, and (2) that the mechanical energy extracted from the drivetrain and wheels during regenerative braking mode must be efficiently converted to electrical power to charge the onboard electric energy storage device. This means that the power losses, which are dissipated in the electric motor during the power conversion process from electrical power to mechanical power and vice versa, and resulting heating and temperature rise must be minimize throughout the drive cycle from startup to high speed in order to achieve improved fuel efficiency.

A very small number of disclosures on combined motor-generator constructions are known in the prior arts for hybrid vehicle and aerospace applications, such as U.S. Pat. No. 4,476,395, U.S. Pat. No. 7,389,837, WO2011106944, and U.S. Pat. No. 8,360,181, and the majority of them are invariably limited to aerospace applications. In particular, a combination induction generator/permanent magnet generator in a single housing was disclosed in U.S. Pat. No. 4,476,395 as a source of electrical power generation in aircrafts. However, the invention was directed to the use of a tandem induction generator/permanent magnet generator combination for the role particularly limited to electrical power generation in aircrafts. The invention described herein differs from prior arts in the construction and method of control that overcome the drawbacks discussed above in order to achieve the objective of the present invention, which is to improve fuel efficiency of a belt-driven parallel hybrid vehicle.

Therefore, there is a need to provide a starter-generator for a hybrid vehicle application that converts: (1) the electric energy supplied by the onboard electric energy storage device more efficiently to provide mechanical power that is transmitted to the drivetrain and wheels, and (2) the mechanical energy captured during regenerative braking more efficiently to electrical power for charging the onboard electric energy storage device.

Accordingly, it is an object of this present invention to provide a starter-generator construction that combines an induction motor-generator that operates mainly in motoring mode and a permanent magnet motor-generator that operates mainly in generating mode in a compact single housing enclosure so that it easily mounts as a belt-starter alternator (BAS) for the benefits of further improving fuel efficiency of the prior art belt-driven parallel hybrid vehicle, and which overcomes the disadvantages of the induction motor-generator in generative mode and permanent magnet motor-generator magnetic drag losses during periods of non-utilization at moderate to high speeds in a drive cycle of a hybrid vehicle.

BRIEF DESCRIPTION OF THE INVENTION

Disclosed in the present invention is a tandem starter-generator construction, which is compact and combines two types of motor-generators, that is capable of improving the fuel efficiency of the prior art hybrid vehicle. It includes an induction motor-generator, a permanent magnet motor-generator, and a power transmission unit (PTU) that is disposed adjacent to the motor-generators. In this configuration, the induction motor-generator is utilized predominantly as a motor to provide high traction power at relatively high efficiency during motoring mode, and may be utilized as a generator to apply regenerative brake to a hybrid vehicle and generate electrical power as needed. Meanwhile, the permanent magnet motor-generator is utilized predominantly as a generator for very high efficiency power conversion from mechanical power to electrical power, and to capture additional regenerative energy from the drivetrain and wheels during regenerative braking of a hybrid vehicle. The additional regenerative energy captured by the permanent magnet motor-generator at very high efficiency adequately compensates for the lower regenerative energy conversion to electrical power by the induction motor-generator. In essence, the motor-generator structure having an induction motor-generator and a permanent magnet motor-generator disclosed in the present invention, wherein the induction motor-generator operates mainly in motor mode and in generator mode as needed to provide regenerative braking and the permanent magnet motor-generator operates only in generator mode, overcomes the drawbacks of an induction motor operating in regenerative mode and a permanent magnet motor magnetic drag losses during periods of non-utilization at moderate to high speeds and makes it feasible to improve fuel efficiency of a parallel hybrid vehicle.

The tandem starter-generator comprises two stator assemblies, two rotor assemblies and a power transmission unit (PTU) all integrated and enclosed in a single compact housing. The stator assemblies include an induction motor-generator stator assembly and a permanent magnet motor-generator stator assembly. The rotor assemblies include a squirrel-cage type induction rotor assembly and a permanent magnet rotor assembly. The power transmission unit may be disposed adjacent to the induction motor-generator and permanent magnet motor-generator and mechanically linked on both ends to the rotating rotor shafts such that the rotors are rotatable relative to each other at different speeds with respect to the housing. In one example embodiment of the present invention, the power transmission unit is connected on both ends to the rotor shafts and disposed axially at least partially inside the squirrel-cage rotor of the induction motor-generator such that the rotors are rotatable relative to each at different speeds with respect to the housing. In another embodiment of the present invention, the power transmission unit is connected on both ends to the rotor shafts and disposed between the induction and permanent motor-generators such that the rotors rotate relative to each other at different speeds with respect to the housing. In yet another embodiment of the present invention, the power transmission unit is connected to the rotor shafts, disposed between the induction and permanent motor-generators and configured such that the rotors are rotatable at the same speed. transparent The power transmission unit of the tandem starter-generator may be constructed as a planetary gear train mechanism, belt drive and pulley mechanism or electromechanical control mechanism. A single stage planetary gear train mechanism is utilized as an exemplary embodiment of the power transmission unit to describe the invention according to the embodiments of the tandem starter-generator of the present invention. The single stage planetary gear train mechanism, which includes a sun gear, a planetary carrier and a ring gear and is disposed adjacent to the induction motor-generator and permanent magnet generator, provides a mechanical means to increase the rotational speed of at least one of the rotors. This technique results in reduction of the overall physical size and weight of the tandem starter-generator, thus improvement the power density and capability. In a similar manner, a pulley and timing belt mechanism or an electromechanical control mechanism can be utilized as a means for increasing the rotational speed of at least one of the rotors of the motor-generators in order to reduce physical size and weight, and improve power density and capability.

The tandem starter-generator is mechanically linked to the engine of a hybrid vehicle powertrain via a serpentine belt, a drive pulley attached to one of its rotor shafts and a crankshaft pulley connected to engine to construct a power-assist parallel-structured hybrid vehicle powertrain. This parallel structure of the hybrid vehicle powertrain constructed enables the output mechanical power of the tandem starter-generator to be transmitted to the drivetrain and wheels, thereby providing a means to improve fuel efficiency.

In accordance with the embodiments of the present invention, the induction motor operates predominantly in motor mode to deliver mechanical power to the drivetrain as well as in generator mode to provide regenerative braking as needed and the permanent magnet motor-generator operates only in generator mode to deliver electrical power throughout the drive cycle of a hybrid vehicle. The motoring and generating modes of the induction motor-generator are determined based on the instantaneous driving conditions or states of a hybrid vehicle powertrain and controlled based on the allocation of the mechanical power delivered to the drivetrain and electrical power delivered to charge the onboard electric energy storage device. In a similar manner, the permanent magnet motor-generator operates only in generating mode during the driving conditions of a hybrid vehicle powertrain and this mode is controlled based on maintaining at least the minimum thresholds for the state-of-charge of the onboard electric energy storage devices in order to achieve improvement in fuel efficiency.

Also, disclosed is a tandem starter-generator system including a tandem starter-generator mounted thereon, a dc-to-dc converter control unit (DCCU), two bidirectional inverter/converter control units (ICCUs), a supervisory control module (SCM), and an electric energy storage device that may include battery banks and super-capacitors. The tandem starter-generator comprises an induction motor-generator and a permanent magnet motor-generator having a squirrel-cage type induction rotor assembly and a permanent magnet rotor assembly. In one example embodiment of the present invention, the two rotor assemblies are mechanically linked to a power transmission unit configured such that they are rotatable at the same speed. In another example embodiment of the present invention, a single stage planetary gear train mechanism is disposed between and mechanically linked to the rotor shafts of the induction and permanent magnet motor-generators such that the rotors rotate relative to each other at different speeds with respect to the housing. In yet another embodiment of the present invention, a single stage planetary gear train mechanism is axially disposed at least partially inside the rotor of the induction motor and mechanically linked on both ends to the rotor shafts such that the rotors are rotatable relative to each at different speeds with respect to the housing. The primary function of the planetary gear train mechanism is to increase the rotational speed of the rotor of the permanent magnet motor-generator so that its physical size and weight needed to match the required power is significantly reduced, thereby ensuring increased output electrical power density and capability. The function of the supervisory control module is to synthesize the tandem starter-generator system and hybrid vehicle sensor input data into commands for monitoring and executing the overall power management, power control and protection functions. The DCCU provides dc power conversion of the ac electrical power generated by the permanent magnet motor-generator which operates only in generate mode to charge the onboard auxiliary electric energy device that provides electrical power to the auxiliary loads. Meanwhile, the ICCUs drives and controls the induction motor-generator operating in motor mode using electrical power from the system electric energy storage device. It also provides dc power conversion of the ac electrical power generated by the induction motor-generator during regenerative braking and ac electrical power generated by the permanent magnet motor-generator operating as a generator for charging the system electric energy storage device.

Also, disclosed in the present invention is a parallel hybrid vehicle including the tandem starter-generator system mounted thereon that takes advantage of the characteristics of the tandem induction motor-generator and permanent magnet motor-generator construction to achieve improvement in fuel efficiency.

Also, disclosed in the present invention is a method for controlling the output mechanical power and electrical power balance between the tandem induction motor-generator and permanent magnet motor-generator, onboard electric energy storage devices and engine during various driving conditions of a hybrid vehicle in order to improve fuel efficiency.

Hereafter, since the induction motor-generator operates in motor and generator modes and permanent magnet motor-generator operates only in generator mode, the induction motor-generator will be referred to as "induction motor" and the permanent magnet motor-generator will be referred to as "permanent magnet generator".

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

The present invention seeks to provide a starter-generator solution for a belt-driven parallel hybrid vehicle that overcomes the functional drawbacks associated, as described earlier, with squirrel-cage type induction motor operating in regenerative mode and permanent magnet generator rotating magnetic drag losses during drive cycle periods of non-utilization at moderate to high speeds to improve fuel efficiency.

Hereafter, the embodiments of the present invention will be explained referring to the accompanying drawings having a single stage planetary gear train mechanism as an exemplary embodiment of the power transmission unit.

Accordingly, the first object of the present invention is to provide a compact tandem starter-generator construction that comprises an induction motor and a permanent magnet generator in tandem; a single stage planetary gear train mechanism having a sun gear member, a planet carrier member and a ring gear member, and two shafts.

The second object of the present invention is to provide a tandem starter-generator system for controlling the operating modes as well as output mechanical power and electrical power of the induction motor and permanent magnet generator.

The third object of the present invention is to provide a method for controlling the mechanical power and electrical power balance between the tandem starter-generator, electric energy storage device and engine during various driving conditions of a hybrid vehicle in order to improve fuel efficiency.

A detailed description of one or more embodiments of the disclosed tandem starter-generator is presented herein by way of exemplification and not limitation with reference to the Figures. It should be understood that although a hybrid power train has been used to describe one preferable application, the example tandem starter-generator construction illustrated in the embodiments of the present invention could be used in other applications.

First Embodiment

Figure 1:
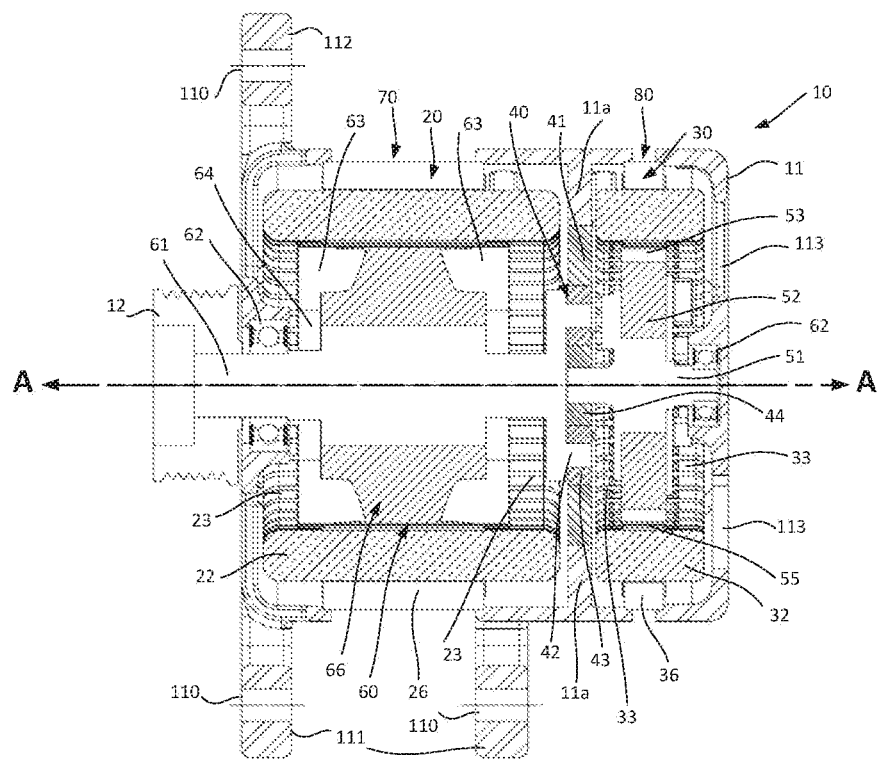
FIG. 1 is a cross-sectional view of a tandem induction motor-permanent magnet generator construction according to a preferred embodiment of the present invention.
Figure 11:
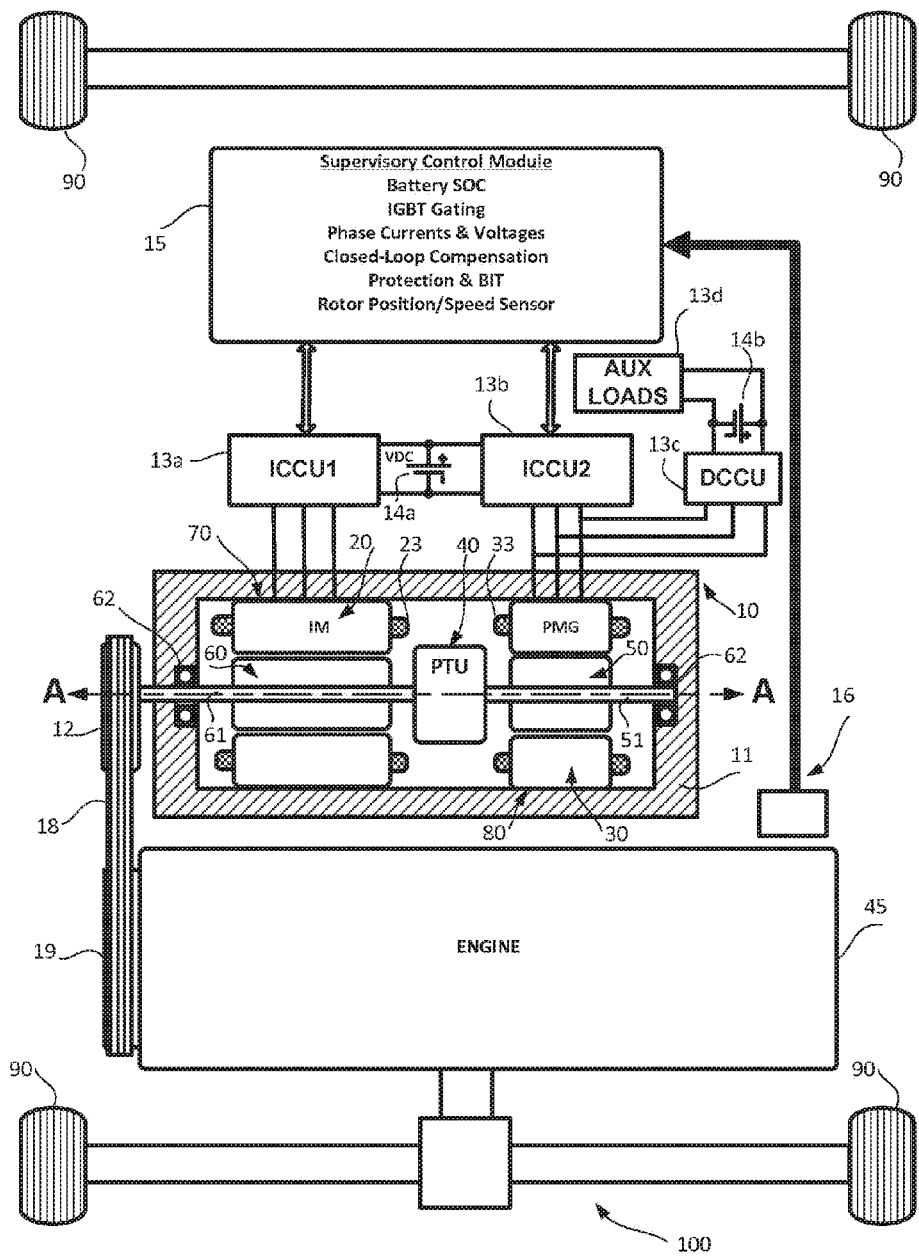
FIG. 11 illustrates a parallel hybrid vehicle application of a starter-generator system according to any of the embodiments of the present invention.

FIG. 1 is a schematic cross-sectional view of a compact construction of a tandem starter-generator assembly 10 (also referred to as "assembly 10") in accordance with a preferred embodiment of the present invention. The assembly 10 comprises: (a) an induction motor assembly 70 that includes a stator assembly 20 surrounding a squirrel-cage rotor assembly 60 attached to a shaft 61; (b) a permanent magnet generator assembly 80 that includes a stator assembly 30 surrounding a permanent magnet rotor assembly 50 attached to a shaft 51; (c) a planetary gear train mechanism 40 disposed axially in the radially inner space which is provided radially inwardly of the axially extending stator coil end-turns 23 and 33 of the induction motor and permanent magnet generator; and (d) a drive pulley 12 having a plurality of grooves, or sprocket having a plurality of teeth (not shown), that provides a means for coupling and torque transfer to and from the engine 45 crankshaft pulley 19 of a hybrid vehicle powertrain via a serpentine belt 18 as shown in FIG. 11, or flexible chain (not shown). The planetary gear train mechanism 40 comprises a ring gear member 41, a planet carrier member 42 having a plurality of planets 43 mounted thereon and a sun gear member 44.

The stator assembly 20 of the induction motor assembly 70 is a stationary assembly and the squirrel-cage rotor 60 and its shaft 61 rotate with respect to the stator assembly 20. Similarly, the stator assembly 30 of the permanent magnet generator assembly 80 is a stationary assembly and the rotor 50 and its shaft 51 rotate with respect to the stator assembly 30. The induction motor assembly 70 and permanent magnet generator assembly 80 are in tandem with the planetary gear train mechanism 40 disposed axially between them in the radially inner space provided by the axially extending stator coil end-turns 23 and 33 to form a series arrangement. The purpose of the of the planetary gear train mechanism 40 in this embodiment as well as other embodiments of the present invention is to provide a means to increase the rotational speed of the permanent magnet rotor assembly 50 so that its size is significantly reduced for the required power level; thereby reducing the overall weight and physical size of the tandem starter-generator as well as improving power density and capability.

Furthermore, the induction motor 70 and permanent magnet generator 80 have stator coils 22 and 32 that axially extends such that a radially inner space is provided radially inwardly of the stator coil end-turns 23 and 33, and the planetary train mechanism 40 is disposed in the radially inner space as illustrated in FIG. 1. This arrangement effectively utilizes the radial inner space provided radially inwardly of the stator coil end-turns 23 and 33 to dispose the planetary gear mechanism 40 between the induction motor and permanent magnet generator and making it possible to reduce the axial dimension of the planetary gear train mechanism, thereby further reducing required overall axial dimension of the tandem starter-generator.

The induction motor is utilized primarily as an electric motor and it is required to provide a comparatively large torque to assist the engine of a parallel hybrid vehicle powertrain, and as a result the induction motor is constructed to have a larger size (axial length) than the permanent magnet generator which operates at multiple times the rotational speed of the induction motor. However, the induction motor may also be operated as an electric generator to apply regenerative braking to the hybrid vehicle as needed.

Figure 2:
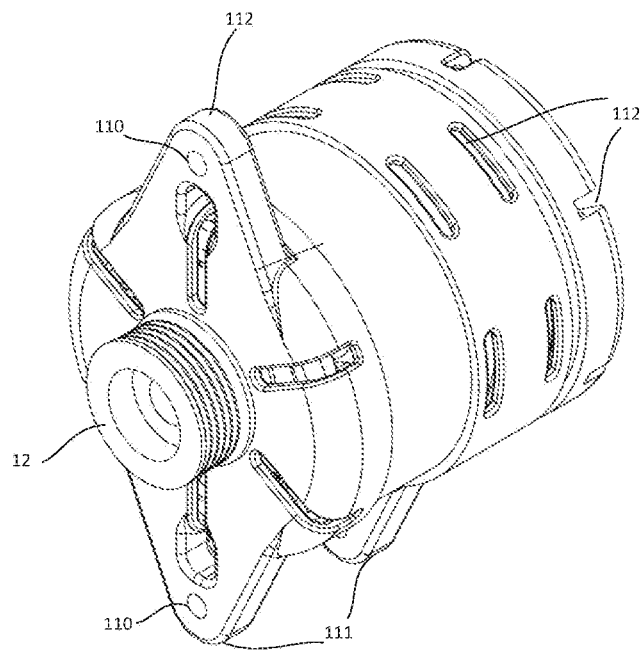
FIG. 2 is an isometric view of a compact construction of a tandem induction motor-permanent magnet generator according to the preferred embodiment of the present invention.

The tandem starter-generator assembly 10 comprising an induction motor assembly 70, a permanent magnet generator assembly 80 and a planetary gear train mechanism 40 arranged coaxially with each other with respect to the axis A in a single compact housing 11 as shown in FIG. 2. The housing 11 may incorporate vents 113 to improve air cooling of the multiphase windings 22 and 32 of the starter-generator. The housing 11 also incorporates a dual foot mount 111 for mounting to the engine and a second mount 112 for attachment to an adjustment arm attached to the engine 45.

Figure 3:
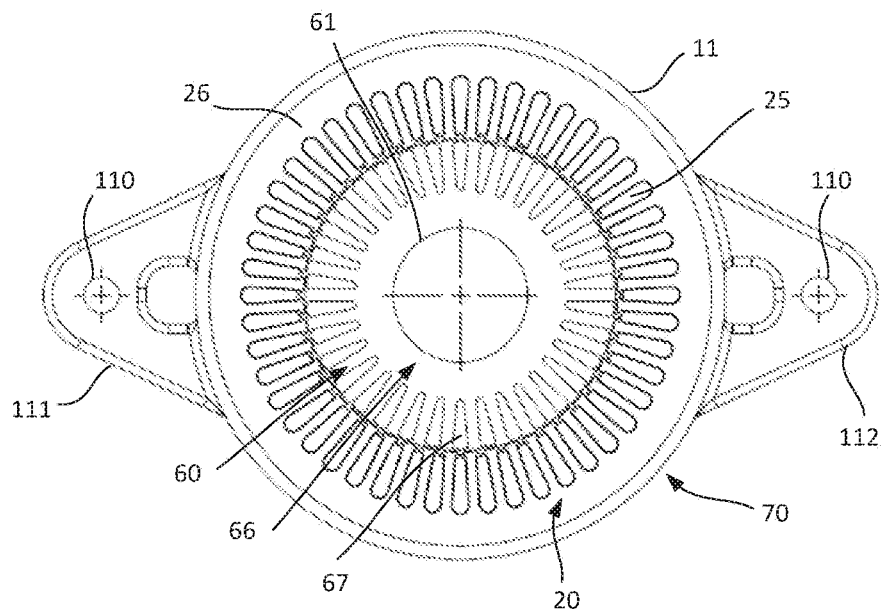
FIG. 3 is a cross-sectional view of the induction motor stator and rotor construction of a tandem induction motor-permanent magnet generator according to the preferred embodiment of the present invention.

Referring now to FIG. 1 and FIG. 3 that show schematic representations of a tandem starter-generator and an induction motor of the preferred embodiment of the present invention. The induction motor assembly 70 includes a stator assembly 20 and a squirrel-cage rotor assembly 60. The stator assembly 20 comprises a stack of laminations 26 having multiple axially extending circumferentially arranged slots 25 and having coils 22 wound therein to form a multiphase winding. In the example, the stator stack 26 includes forty-eight slots arranged at about every 7.5 degrees about the outer circumference, although the disclosure applies to different slot combinations. The squirrel-cage rotor assembly includes a skewed stack of laminations 66 attached to a shaft 61, and having multiple axially extending circumferentially arranged slots 67 and having a plurality of damper bars 63 inserted. The rotor stack 66 includes thirty-four slots arranged at about 10.59 degrees about the outer circumference, although the disclosure applies to different slot combinations. The damper bars 63 made of conductive material are connected on both ends of the rotor by end-rings 64 also made of conductive material to form an amortisseur winding. The construction of the rotor 60 of the induction motor assembly 70 described above is simple and rugged, and has a well-established and inexpensive manufacturing technology.

Figure 4:
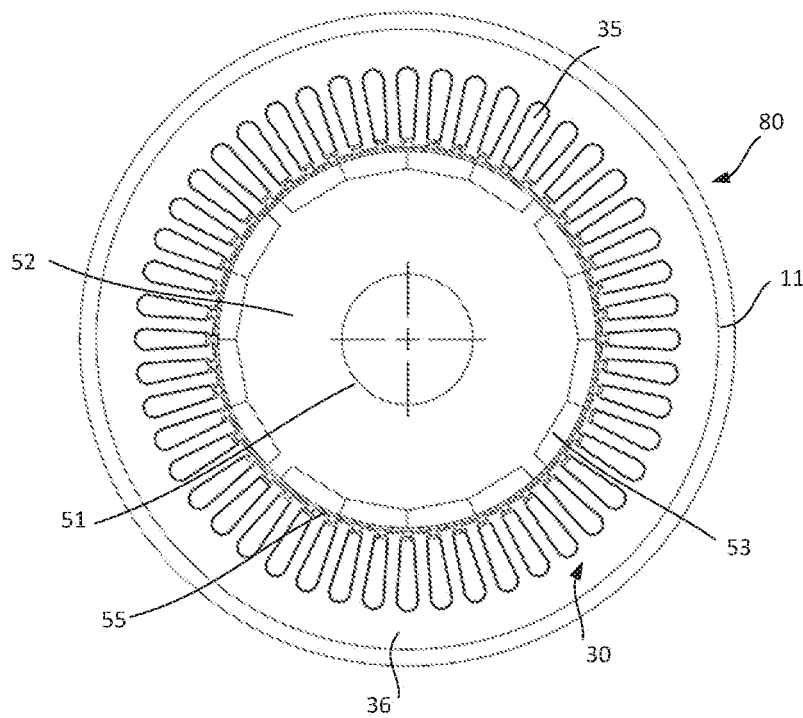
FIG. 4 is a cross-sectional view of the permanent magnet generator stator and rotor construction of a tandem induction motor-permanent magnet generator according to the preferred embodiment of the present invention.

Referring now to FIG. 1 and FIG. 4 that show schematic representations of a tandem starter-generator and a permanent magnet generator of the preferred embodiment of the present invention. The permanent magnet generator assembly 80 includes a stator assembly 30 and a permanent rotor assembly 50. The stator assembly 30 includes a stack of laminations 36 having multiple axially extending circumferentially arranged slots 35 and having coils 32 wound therein to form a multiphase winding. The permanent magnet rotor assembly 50 may include a stack of laminations or solid piece hub 52 connected to a shaft 51, and having a plurality of permanent magnets 53 on its surface or embedded into axially extending circumferentially arranged slots (not shown). The permanent magnet rotor 50 comprises four magnetic poles, that is, two poles with a north magnetic polarity and two poles with a south magnetic polarity. Each north magnetic pole may be constructed using a plurality of trapezoidal-shaped segmented magnet pieces all having north magnetic polarity, and each south magnetic pole may be constructed using four trapezoidal-shaped segmented magnet pieces all having south magnetic polarity. The permanent magnets are mechanically retained against the rotor lamination stack 52 (or solid piece hub) during high rotational speed and high temperature conditions by a retaining sleeve 55 that is made of conductive or non-conductive materials.

Figure 10:
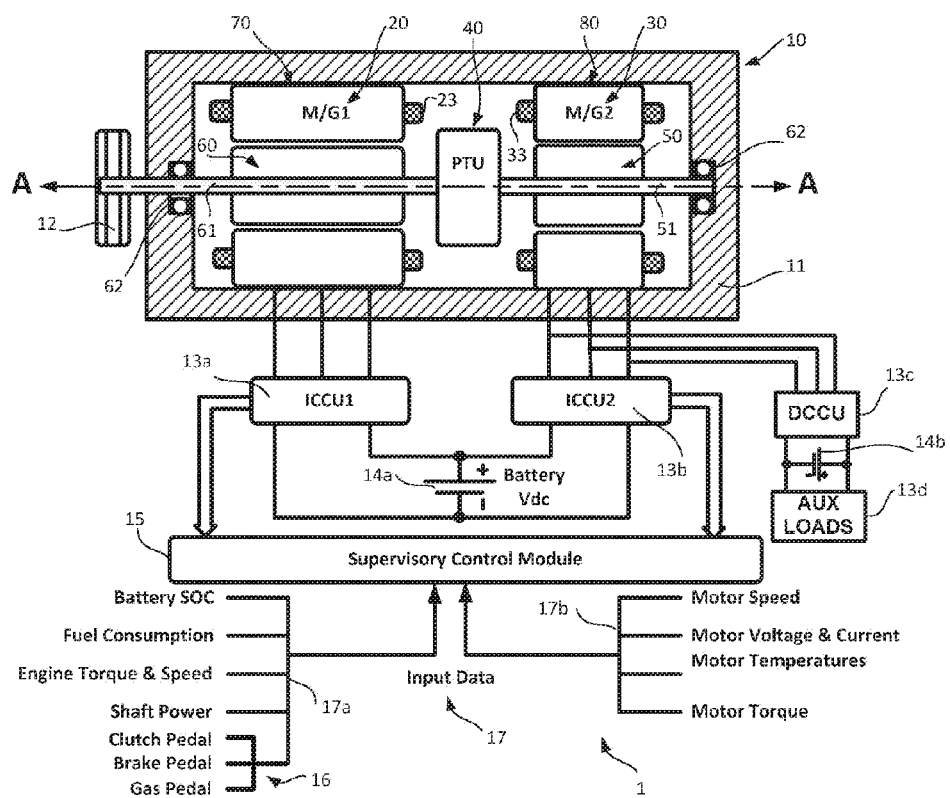
FIG. 10 illustrates a starter-generator system to control a tandem induction motor-permanent magnet generator according to any of the embodiments of the present invention.

Referring to FIG. 10 that illustrates a starter-generator system assembly 1 (also referred to as "assembly 1") according to an embodiment of the present invention. The assembly 1 comprises: (1) a tandem starter-generator assembly 10; (2) a dc-to-dc converter control unit (DCCU) 13*c* that provides dc power conversion of the ac power generated by the permanent magnet generator 80 to charge the auxiliary electric energy storage device 14*b* that supports the operation of the onboard auxiliary load and devices 13*d* of a hybrid vehicle; (3) a first bidirectional inverter/converter control unit (ICCU1) 13*a* that drives and controls the induction motor to operate primarily in motor mode to provide mechanical power to the drivetrain and wheels 90 and may operate as needed in regenerative braking mode of a hybrid vehicle as a generator to provide electrical power to charge the onboard electric energy storage device 14*a*; (4) a second bidirectional inverter/converter control unit 13*b* (ICCU2) that drives and controls the permanent magnet generator to operate only in generator mode to provide electrical power to charge the onboard electric energy storage device 14*a*; (5) a supervisory control module (SCM) 15 that synthesizes vehicle and starter-generator sensor input data 17 into commands for executing the overall power management, power control and protection function of the system assembly 1; (6) an electric energy storage device 14*a* of the system that supports main system functions; and (7) an auxiliary electric energy storage device 14*b* of the system that supports auxiliary load and device functions.

The amount of mechanical power provided by the induction motor and electrical power generated by the permanent magnet generator are simultaneously controlled based on a concrete procedure of the supervisory control module 15 in accordance with the driving conditions of the vehicle 100 of FIG. 11 in order to achieve improved fuel efficiency and maintain at least the minimum state-of-charge for the onboard electric energy storage devices 14*a* and 14*b*.

Figure 5:
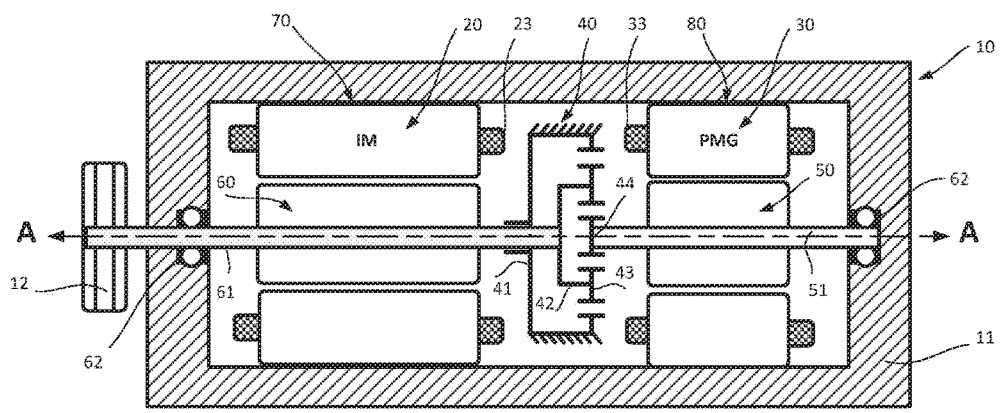
FIG. 5 is a cross-sectional view of a tandem induction motor-permanent magnet generator construction according to a second embodiment of the present invention.

The operational principle of the tandem starter-generator construction of the preferred embodiment are described below with reference to the schematic view of FIG. 1 and cross-sectional view of FIG. 5. The tandem starter-generator assembly 10 of this embodiment includes an induction motor, a permanent magnet generator, and a planetary gear train mechanism 40 disposed in the radial inner space provided by the axially extending end-turns 23 and 33 of the stator coils 22 and 32. The planetary gear train mechanism 40 includes: (1) a ring gear 41 that is not rotatable and held stationary by a partition wall 11*a* formed integrally with the housing 11 and disposed between the end-turns 23 and 33, and it extends radially inwards to engage circumferentially the outer diameter of the ring gear 41; (2) a planet carrier 42 connected to the rotor shaft 61 of the induction motor 70; and (3) a sun gear 44 connected to the rotor shaft 51 of the permanent magnet generator 80. Hollow shafts having internal splines are formed integrally with the planet carrier 42 and sun gear 41 for mechanical coupling with external splines integrally formed on the rotor shaft 61 and shaft 51 of the induction motor 70 and permanent magnet generator 80. The induction motor-generator 70 rotor shaft 61 is the drive shaft and attached to one end is the pulley 12 of the assembly 10 having a plurality of grooves for mechanical coupling and torque transfer to and from the engine 45 crankshaft pulley 19 by means of a high tension serpentine belt 18. Both of the rotor shafts 61 and 51 of the induction motor 70 and permanent magnet generator 80 are supported within the housing by bearings 62. When the rotor shaft 61 of the induction motor 70 rotates, the planet carrier 42 rotates at the same speed and the rotor shaft 51 of the permanent magnet generator connected to the sun gear 44 rotates at a higher speed relative to the rotor 60 of the induction motor 70.

The planetary gear train mechanism 40 is arranged to provide the fundamental function as a power transfer mechanism to receive a rotational speed and torque (or mechanical power) from the induction motor 70 and transmit it to the permanent magnet generator in such a manner that the torque is scaled down by multiplying it by the reciprocal of the planetary gear train mechanism 40 gear ratio conversion factor and the rotational speed is scaled up by multiplying it by the planetary gear train mechanism 40 gear ratio conversion factor in order to maintain the same mechanical power. It will be understood that the planetary gear train mechanism 40 gear ratio conversion factor is dependent on the manner in which the planetary gear train mechanism 40 members that include the ring gear, planet carrier and sun gear are connected to the rotor shaft 61 and shaft 51 of the induction motor 70 and permanent magnet generator 80. Different connection arrangements to the rotor shaft 61 and shaft 51 of the induction motor 70 and permanent magnet generator 80 yield different gear ratio conversion factors. That is, the planetary gear train mechanism 40 is serving to transfer the same mechanical power provided by the induction motor 70 by increasing the rotational speed and decreasing the torque of the permanent magnet generator 80 in accordance with the mechanics of planetary gears. Accordingly, the size of the permanent magnet generator 80 required to match the mechanical power transferred from the rotor shaft 61 of the induction motor-generator 70 is smaller than the size of the induction motor 70. Therefore, the permanent magnet generator 80 is constructed to have a smaller size than the induction motor 70, thereby significantly reducing the overall physical size and weight of the tandem starter-generator assembly 10, thus ensuring improved power density and capability.

For stable operation of this embodiment of the tandem starter-generator assembly 10 of FIG. 1 during power assist mode of a hybrid vehicle powertrain, the mechanical torque output from the induction motor 70 and mechanical torque input to the permanent magnet generator 80 to generate electrical power must be in dynamic equilibrium at all instants in time such that the mechanical power balance is conserved. This means that the maximum torque input that may be required to the permanent magnet generator 80 to generate electrical power is obtained as a result of the fundamental torque conversion process in the tandem starter-generator of the mechanical power output from the induction motor 70 as controlled by the ICCU1 based on the driving conditions of a hybrid vehicle powertrain. The permanent magnet generator 80 electrical power allocation for charging the electric energy storage devices 14*a* and 14*b* is controlled by the ICCU2 13*b* as determined by a concrete procedure of the supervisory control module 15 in accordance with the mechanical power available from the engine, driving conditions and the current state-of-charge of the electric energy storage devices 14*a* and 14*b* with respect to set minimum thresholds.

In regenerative braking mode of a hybrid vehicle, both the induction motor 70 and permanent magnet generator 80 require input mechanical torque must be provided by a hybrid vehicle powertrain in order to generate electrical power to charge the onboard electric energy storage devices 14a and 14b. The maximum mechanical torque input that may be required to the induction motor assembly 70 at a given rotational speed is transmitted as mechanical power from the engine 45 crankshaft pulley 19 to the assembly 10 pulley 12. The maximum mechanical torque input that may be required to the permanent magnet generator 80 to generate electrical power is obtained as a result of the torque conversion process in the tandem starter-generator of the mechanical power transmitted from the engine 45 crankshaft pulley 19 to the induction motor-generator 70 rotor shaft 61 and planet carrier 42, and then outputted to the sun gear 44 and rotor shaft 51 of the permanent magnet generator. The allocations of the induction motor maximum electrical power and permanent magnet generator maximum electrical power generated to charge the electric energy storage devices 14a and 14b are controlled by the ICCU1 13a and ICCU2 13b as determined by a concrete procedure of the supervisory control module 15 in accordance with the mechanical power available from the engine, driving conditions and the current state-of-charge of the electric energy storage devices 14a and 14b with respect to set minimum thresholds.

It will be understood in the present invention that the operational principle of the preferred embodiment discussed above is based on the assumption that the combined efficiency of the planetary gear train mechanism 40, tandem induction motor-permanent magnet generator assembly 10 and power inverters/converters 13a and 13b is ideally equal to one hundred percent (100%). However, in actual operation of the tandem starter-generator the efficiency is less than 100%, and this means that it is required to make the mechanical power output from the rotor shaft 61 of the induction motor 70 greater than the mechanical power input to the sun gear 44 and rotor shaft 51 of the permanent magnet generator 80.

Second Embodiment

Figure 6:
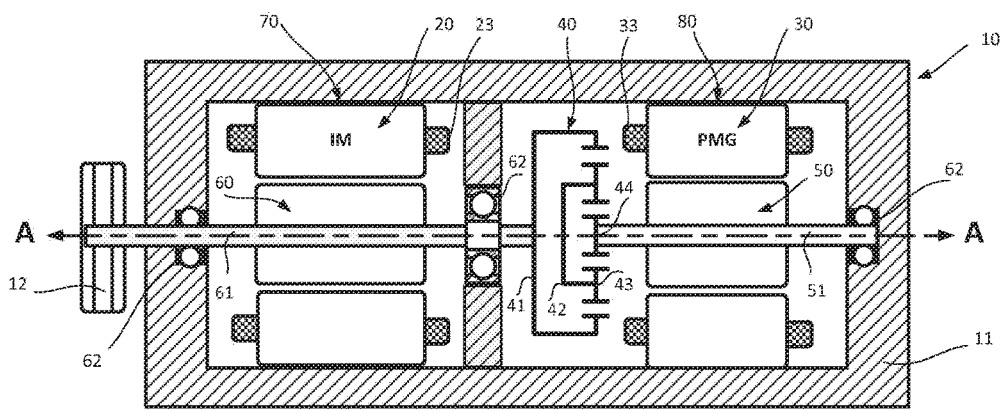
FIG. 6 is a cross-sectional view of a tandem induction motor-permanent magnet generator construction according to a third embodiment of the present invention.

FIG. 6 illustrates a cross-sectional view of a tandem starter-generator assembly 10 in the second embodiment of the present invention. In this embodiment, the assembly 10 comprises an induction motor assembly 70, a permanent magnet generator assembly 80 and a planetary gear train mechanism 40. The difference from the first embodiment is that in the second embodiment the ring gear member 41 of the planetary gear train mechanism 40 is not held stationary and is rotatable with respect to the housing. The planetary gear train mechanism 40 is disposed axially in the radial inner space provided by the axially extending end-turns 23 and 33 of the stator coils 22 and 32 of the induction motor assembly 70 and permanent magnet generator assembly 80. The planetary gear train mechanism 40 includes a ring gear 41 that is rotatable and connected to the rotor shaft 61 of the induction motor assembly 70; a planet carrier 42 that is freely rotatable; and a sun gear 44 connected to the rotor shaft 51 of the permanent magnet generator 80. Hollow shafts having internal splines are formed integrally with the ring gear 41 and sun gear 41 for mechanical coupling with external splines integrally formed on the rotor shaft 61 and shaft 51 of the induction motor 70 and permanent magnet generator 80. The induction motor 70 shaft 61 is the drive shaft and attached to one end is a drive pulley 12 of the assembly 10 having a plurality of grooves for mechanical coupling and torque transfer to and from the engine 45 crankshaft pulley 19 via a high tension serpentine belt. Both of the rotor shaft 61 and shaft 51 of the induction motor 70 and permanent magnet generator 80 are supported within the housing by bearings 62. When the rotor shaft 61 of the induction motor 70 rotates, the ring gear 41 rotates at the same speed, the planet carrier 42 is freely rotatable and rotates at a higher speed relative to the ring gear 41, and the rotor shaft 51 of the permanent magnet generator 80 connected to the sun gear 44 rotates at a higher speed relative to the rotor of the induction motor 70.

The planetary gear train mechanism 40 is arranged to primarily function as a power transfer mechanism to receive a rotational speed and torque (that is mechanical power) from the induction motor 70 and transmit it to the permanent magnet generator 80 in such a manner that the torque is scaled down by multiplying it by the reciprocal of the planetary gear train mechanism 40 gear ratio conversion factor and rotational speed is scaled up by multiplying it by the planetary gear train mechanism 40 gear ratio conversion factor to maintain the same mechanical power. It will be understood that the planetary gear train mechanism 40 gear ratio conversion factor is dependent on the manner in which the planetary gear train mechanism 40 members that include the ring gear, planet carrier and sun gear are connected to the rotor shaft 61 and shaft 51 of the induction motor 70 and permanent magnet generator 80. Different connection arrangements to the rotor shaft 61 and shaft 51 of the induction motor 70 and permanent magnet generator 80 yield different gear ratio conversion factors. The planetary gear train mechanism 40 is serving to transfer the mechanical power provided by the induction motor 70 by increasing the rotation speed and decreasing the torque of the permanent magnet generator 80 in accordance with the mechanics of planetary gears. Accordingly, the size of the permanent magnet generator 80 required to match the mechanical power transferred from the rotor shaft 61 of the induction motor 70 is smaller than the size of the induction motor 70. Thus, the permanent magnet generator 80 is constructed to have a smaller size than the induction motor 70, thereby significantly reducing the overall physical size and weight of the tandem starter-generator assembly 10, and ensuring improved power density and capability.

One aspect of the second embodiment of the present invention is that the speed of the freely rotatable planet carrier 42 is not set and it depends on the rotating speeds of the ring gear 41 and sun gear 44. Based on planetary gear characteristics, the determination of the rotational speeds of any two gear members automatically results in setting the rotating speed of the remaining planetary gear member. In essence, this connection arrangement of the planetary gear train mechanism 40 to the rotor shaft 61 and shaft 51 of the induction motor-generator 70 and permanent magnet generator 80 provides one degree of freedom to set the rotating speed of the sun gear 44, and hence the rotating speed of the permanent magnet generator 80 rotor shaft 51. For a given engine 45 torque and speed, a preferable choice is the rotating speed that gives the maximum possible efficiency, thereby enhancing the overall efficiency of the starter-generator assembly 10.

For stable operation of this embodiment of the tandem starter-generator assembly 10 of FIG. 6 during power assist mode of a hybrid vehicle powertrain, the mechanical torque output from the induction motor 70 and mechanical torque input to the permanent magnet generator 80 to generate electrical power must be in dynamic equilibrium at all instants in time such that the mechanical power balance is conserved. This means that the maximum torque input that may be required to the permanent magnet generator 80 to generate electrical power is obtained as a result of the fundamental torque conversion process in the tandem starter-generator of the mechanical power output from the induction motor 70 as controlled by the ICCU1 based on the driving conditions of a hybrid vehicle powertrain. The permanent magnet generator 80 electrical power allocation for charging the electric energy storage devices 14a and 14b is controlled by the ICCU2 13b as determined by a concrete procedure of the supervisory control module 15 in accordance with the mechanical power available from the engine, driving conditions and the current state-of-charge of the electric energy storage devices 14a and 14b with respect to set minimum thresholds.

In regenerative braking mode of a hybrid vehicle, both the induction motor 70 and permanent magnet generator 80 require input mechanical torque must be provided by a hybrid vehicle powertrain in order to generate electrical power to charge the onboard electric energy storage devices 14a and 14b. The maximum mechanical torque input that may be required to the induction motor assembly 70 at a given rotational speed is transmitted as mechanical power from the engine 45 crankshaft pulley 19 to the assembly 10 pulley 12. The maximum mechanical torque input that may be required to the permanent magnet generator 80 to generate electrical power is obtained as a result of the torque conversion process in the tandem starter-generator of the mechanical power transmitted from the engine 45 crankshaft pulley 19 to the induction motor-generator 70 rotor shaft 61 and ring gear 41, and then outputted to the sun gear 44 and rotor shaft 51 of the permanent magnet generator. The allocations of the induction motor maximum electrical power and permanent magnet generator maximum electrical power generated to charge the electric energy storage devices 14a and 14b are controlled by the ICCU1 13a and ICCU2 13b as determined by a concrete procedure of the supervisory control module 15 in accordance with the mechanical power available from the engine, driving conditions and the current state-of-charge of the electric energy storage devices 14a and 14b with respect to set minimum thresholds.

It will be understood in the present invention that the operational principle of the second embodiment discussed above is based on the assumption that the combined efficiency of the planetary gear train mechanism 40, tandem induction motor-permanent magnet generator assembly 10 and power inverters/converters 13a and 13b is ideally equal to one hundred percent (100%). However, in actual operation of the tandem starter-generator the efficiency is less than 100%, and this means that it is required to make the mechanical power output from the rotor shaft 61 of the induction motor 70 greater than the mechanical power input to the sun gear 44 and rotor shaft 51 of the permanent magnet generator 80.

Third Embodiment

Figure 7:
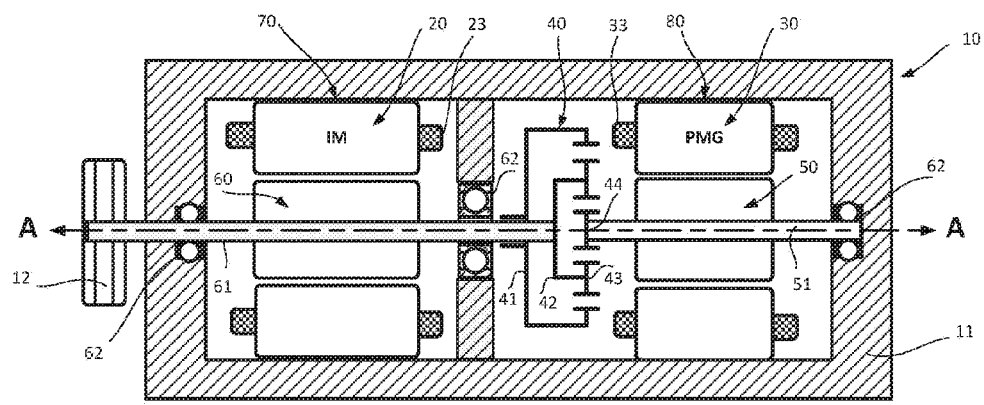
FIG. 7 is a cross-sectional view of a tandem induction motor-permanent magnet generator construction according to a fourth embodiment of the present invention.

A tandem starter-generator in a third embodiment of the present invention is discussed below. In FIG. 7 is shown a cross-sectional view of a third embodiment of a tandem starter-generator assembly 10. The assembly 10 comprises an induction motor assembly 70, a permanent magnet generator assembly 80, and a planetary gear train mechanism 40. The planetary gear train mechanism 40 is disposed axially in the radial inner space provided by the axially extending end-turns 23 and 33 of the stator coils 22 and 32 of the induction motor assembly 70 and permanent magnet generator assembly 80. The planetary gear train mechanism 40 includes a ring gear 41 that is freely rotatable; a planet carrier 42 that is rotatable and connected to the rotor shaft 61 of the induction motor-generator assembly 70; and a sun gear 44 connected to the rotor shaft 51 of the permanent magnet generator assembly 80. Hollow shafts having internal splines are formed integrally with the planet carrier 42 and sun gear 41 for mechanical coupling with external splines integrally formed on the rotor shaft 61 and shaft 51 of the induction motor 70 and permanent magnet generator 80. The induction motor 70 rotor shaft 61 is the drive shaft and attached to one end is a drive pulley 12 of the assembly 10 having a plurality of grooves for mechanical coupling and torque transfer to and from the engine 45 crankshaft pulley 19 via a high tension serpentine belt 18. Both of the rotor shaft 61 and shaft 51 of the induction motor 70 and permanent magnet generator 80 are supported within the housing by bearings 62. When the rotor shaft 61 of the induction motor 70 rotates, the planet carrier 42 rotates at the same speed, the ring gear 41 is freely rotatable and rotates at a lower speed relative to the planet carrier 42, and the rotor shaft 51 of the permanent magnet generator 80 connected to the sun gear 44 rotates at a higher speed relative to the rotor of the induction motor 70.

As described earlier, the planetary gear train mechanism 40 is arranged to primarily function as a power transfer mechanism to receive a rotational speed and torque (that is mechanical power) from the induction motor 70 and transmit it to the permanent magnet generator 80 in such a manner that the torque is scaled down by multiplying it by the reciprocal of the planetary gear train mechanism 40 gear ratio conversion factor and rotational speed is scaled up by multiplying it by the planetary gear train mechanism 40 gear ratio conversion factor to maintain the same mechanical power. It will be understood that the planetary gear train mechanism 40 gear ratio conversion factor is dependent on the manner in which the planetary gear train mechanism 40 members that include the ring gear, planet carrier and sun gear are connected to the rotor shaft 61 and shaft 51 of the induction motor 70 and permanent magnet generator 80. Different connection arrangements to the rotor shaft 61 and shaft 51 of the induction motor 70 and permanent magnet generator 80 yield different gear ratio conversion factors. The planetary gear train mechanism 40 is serving to transfer the mechanical power provided by the induction motor 70 by increasing the rotation speed and decreasing the torque of the permanent magnet generator 80 in accordance with the mechanics of planetary gears. Accordingly, the size of the permanent magnet generator 80 required to match the mechanical power transferred from the rotor shaft 61 of the induction motor 70 is smaller than the size of the induction motor 70. Thus, the permanent magnet generator 80 is constructed to have a smaller size than the induction motor 70, thereby significantly reducing the overall physical size and weight of the tandem starter-generator assembly 10, and ensuring improved power density and capability.

One aspect of this embodiment of the present invention is that the speed of the freely rotatable ring gear 41 is not set and it depends on the rotating speeds of the planet carrier 42 and sun gear 44. Based on the characteristics of planetary gear, the determination of the rotating speeds of any of the two gear members automatically sets the speed of the remaining member of the planetary gear train mechanism 40. The arrangement of the planetary gear train mechanism 40 with respect to its connections to the rotor shafts of the induction motor 70 and permanent magnet generator 80 provides one degree of freedom to set the rotating speed and mechanical power of the sun gear 51, and hence the rotating speed of the permanent magnet generator rotor shaft 51.

Therefore, for a given engine 45 torque and speed, a preferable choice is the rotating speed that gives the maximum possible efficiency, thereby enhancing the overall efficiency of the starter-generator assembly 10.

For stable operation of this embodiment of the tandem starter-generator assembly 10 of FIG. 7 during power assist mode of a hybrid vehicle powertrain, the mechanical torque output from the induction motor 70 and mechanical torque input to the permanent magnet generator 80 to generate electrical power must be in dynamic equilibrium at all instants in time such that the mechanical power balance is conserved. This means that the maximum torque input that may be required to the permanent magnet generator 80 to generate electrical power is obtained as a result of the fundamental torque conversion process in the tandem starter-generator of the mechanical power output from the induction motor 70 as controlled by the ICCU1 13a based on the driving conditions of a hybrid vehicle powertrain. The permanent magnet generator 80 electrical power allocation for charging the electric energy storage devices 14a and 14b is controlled by the ICCU2 13b as determined by a concrete procedure of the supervisory control module 15 in accordance with the mechanical power available from the engine, driving conditions and the current state-of-charge of the electric energy storage devices 14a and 14b with respect to set minimum thresholds.

In regenerative braking mode of a hybrid vehicle, both the induction motor 70 and permanent magnet generator 80 require input mechanical torque must be provided by a hybrid vehicle powertrain in order to generate electrical power to charge the onboard electric energy storage devices 14a and 14b. The maximum mechanical torque input that may be required to the induction motor assembly 70 at a given rotational speed is transmitted as mechanical power from the engine 45 crankshaft pulley 19 to the assembly 10 pulley 12. The maximum mechanical torque input that may be required to the permanent magnet generator 80 to generate electrical power is obtained as a result of the torque conversion process in the tandem starter-generator of the mechanical power transmitted from the engine 45 crankshaft pulley 19 to the induction motor 70 rotor shaft 61 and planet carrier 42, and then outputted to the sun gear 44 and rotor shaft 51 of the permanent magnet generator 80. The allocations of the induction motor 70 maximum electrical power and permanent magnet generator 80 maximum electrical power generated to charge the electric energy storage devices 14a and 14b are controlled by the ICCU1 13a and ICCU2 13b as determined by a concrete procedure of the supervisory control module 15 in accordance with the mechanical power available from the engine, driving conditions and the current state-of-charge of the electric energy storage devices 14a and 14b with respect to set minimum thresholds.

It will be understood in the present invention that the operational principle of the second embodiment discussed above is based on the assumption that the combined efficiency of the planetary gear train mechanism 40, tandem induction motor-permanent magnet generator assembly 10 and power inverters/converters 13a and 13b is ideally equal to one hundred percent (100%). However, in actual operation of the tandem starter-generator the efficiency is less than 100%, and this means that it is required to make the mechanical power output from the rotor shaft 61 of the induction motor 70 greater than the mechanical power input to the sun gear 44 and rotor shaft 51 of the permanent magnet generator 80.

Fourth Embodiment

Figure 8:
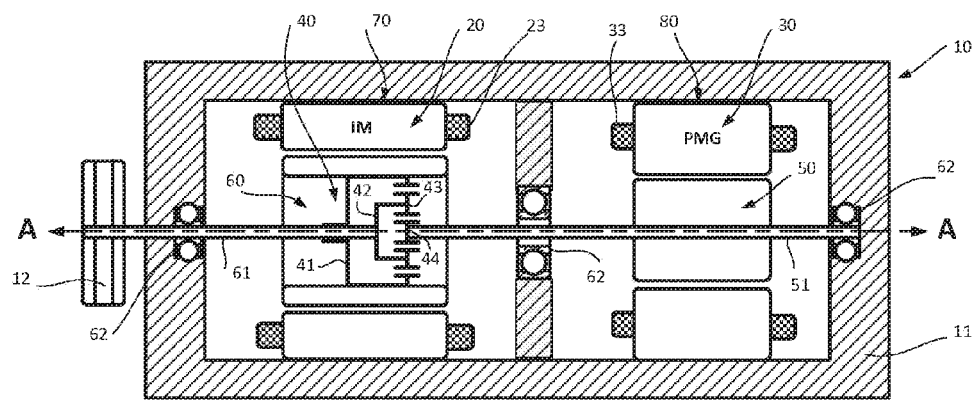
FIG. 8 is a cross-sectional view of a tandem induction motor-permanent magnet generator construction according to a fifth embodiment of the present invention.

A tandem starter-generator in a fourth embodiment of the present invention is discussed below. FIG. 8 illustrates a cross-sectional view of a fourth embodiment of a tandem starter-generator assembly 10. The assembly 10 comprises an induction motor assembly 70, a permanent magnet generator assembly 80, and a planetary gear train mechanism 40. The difference from the first, second and third embodiments of the present invention is that the planetary gear train mechanism 40 is axially disposed inside the inner diameter of the induction motor 70 rotor stack 66 rather than in the radial inner space provided by the axially extending end-turns 23 and 33 of the stator coils 22 and 32 of the induction motor assembly 70 and permanent magnet generator assembly 80. It will be understood that the construction of the tandem starter-generator assembly 10 of the fourth embodiment having the planetary gear train mechanism 40 axially disposed at least partially within an inner cavity of the rotor stack 66 of the induction motor 70 results in further reduction in the overall axial length, thereby further improving the output power density and capability. The planetary gear train mechanism 40 includes a ring gear 41 that is freely rotatable and mechanically coupled to the inner diameter of the rotor stack 66 such that they both rotate at the same speed; a planet carrier 42 that is rotatable and connected to the rotor shaft 61 of the induction motor 70; and a sun gear 44 connected to a rotor shaft 51 of the permanent magnet generator 80. Hollow shafts having internal splines are formed integrally with the planet carrier 42 and sun gear 41 for mechanical coupling with external splines integrally formed on the rotor shaft 61 and shaft 51 of the induction motor 70 and permanent magnet generator 80. The induction motor 70 rotor shaft 61 is the drive shaft and attached to one end is a drive pulley 12 of the assembly 10 having a plurality of grooves for mechanical coupling and torque transfer to and from the engine 45 crankshaft pulley 19 via a high tension serpentine belt 18. Both of the rotor shaft 61 and shaft 51 of the induction motor 70 and permanent magnet generator 80 are supported within the housing by bearings 62. When the rotor shaft 61 of the induction motor 70 rotates the planet carrier 42 rotates at the same speed; the ring gear 41 which is freely rotatable and mechanically coupled to the rotor stack 66 of the induction motor 70 rotor 60 rotates together at the same speed as the rotor assembly 60 relative to the planet carrier 42, wherein the rotor 60 of the induction motor 70 may be appropriately driven at a set rotational speed point; and the rotor shaft 51 of the permanent magnet generator 80 connected to the sun gear 44 rotates at a higher speed relative to the rotor 60 of the induction motor 70.

As described above for the other embodiments of the present invention, the planetary gear train mechanism 40 is arranged to primarily function as a power transfer mechanism to receive a rotational speed and torque (that is mechanical power) from the induction motor 70 and transmit it to the permanent magnet generator 80 in such a manner that the torque is scaled down by multiplying it by the reciprocal of the planetary gear train mechanism 40 gear ratio conversion factor and rotational speed is scaled up by multiplying it by the planetary gear train mechanism 40 gear ratio conversion factor to maintain the same mechanical power. It will be understood that the planetary gear train mechanism 40 gear ratio conversion factor is dependent on the manner in which the planetary gear train mechanism 40 members that include the ring gear, planet carrier and sun gear are connected to the rotor shaft 61 and shaft 51 of the induction motor 70 and permanent magnet generator 80.

Different connection arrangements to the rotor shaft 61 and shaft 51 of the induction motor 70 and permanent magnet generator yield different gear ratio conversion factors. The planetary gear train mechanism 40 is serving to transfer the mechanical power provided by the induction motor 70 by increasing the rotation speed and decreasing the torque of the permanent magnet generator 80 in accordance with the mechanics of planetary gears. Accordingly, the size of the permanent magnet generator 80 required to match the mechanical power transferred from the rotor shaft 61 of the induction motor 70 is smaller than the size of the induction motor 70. Thus, the permanent magnet generator 80 is constructed to have a smaller size than the induction motor 70, thereby significantly reducing the overall physical size and weight of the tandem starter-generator assembly 10, and ensuring improved power density and capability.

This embodiment of the present invention provides two degrees of freedom to set both the driving torque and rotational speed, and essentially mechanical power, with respect to the rotor 60 of the induction motor assembly 70. A preferable choice may be to set the maximum torque and maximum rotational speed, or maximum power, of the induction motor assembly 70 that yield the maximum possible overall efficiency of the tandem starter-generator assembly 10.

In power assist mode, stable operation of this embodiment of the tandem starter-generator assembly 10 of FIG. 8 requires that the mechanical torque output from the induction motor 70 and mechanical torque input to the permanent magnet generator 80 to generate electrical power must be in dynamic equilibrium at all instants in time such that the mechanical power balance is conserved. This means that the maximum torque input that may be required to the permanent magnet generator 80 to generate electrical power is obtained as a result of the fundamental torque conversion process in the tandem starter-generator assembly 10 of the mechanical power output from the induction motor 70 as controlled by the ICCU1 based on the driving conditions of a hybrid vehicle powertrain. The permanent magnet generator 80 electrical power allocation for charging the electric energy storage devices 14a and 14b is controlled by the ICCU2 13b as determined by a concrete procedure of the supervisory control module 15 in accordance with the mechanical power available from the engine, driving conditions and the current state-of-charge of the electric energy storage devices 14a and 14b with respect to set minimum thresholds.

In regenerative braking mode of a hybrid vehicle, both the induction motor 70 and permanent magnet generator 80 require input mechanical torque must be provided by a hybrid vehicle powertrain in order to generate electrical power to charge the onboard electric energy storage devices 14a and 14b. The maximum mechanical torque input that may be required to the induction motor assembly 70 at a given rotational speed is transmitted as mechanical power from the engine 45 crankshaft pulley 19 to the assembly 10 pulley 12. The maximum mechanical torque input that may be required to the permanent magnet generator 80 to generate electrical power is obtained as a result of the torque conversion process in the tandem starter-generator of the mechanical power transmitted from the engine 45 crankshaft pulley 19 to the induction motor-generator 70 rotor shaft 61 and planet carrier 42, and then outputted to the sun gear 44 and rotor shaft 51 of the permanent magnet generator. The allocations of the induction motor 70 maximum electrical power and permanent magnet generator 80 maximum electrical power generated to charge the electric energy storage devices 14a and 14b are controlled by the ICCU1 13a and ICCU2 13b as determined by a concrete procedure of the supervisory control module 15 in accordance with the mechanical power available from the engine, driving conditions and the current state-of-charge of the electric energy storage devices 14a and 14b with respect to set minimum thresholds.

It will be understood in the present invention that the operational principle of the second embodiment discussed above is based on the assumption that the combined efficiency of the planetary gear train mechanism 40, tandem induction motor-permanent magnet generator assembly 10 and power inverters/converters 13a and 13b is ideally equal to one hundred percent (100%). However, in actual operation of the tandem starter-generator the efficiency is less than 100%, and this means that it is required to make the mechanical power output from the rotor shaft 61 of the induction motor 70 greater than the mechanical power input to the sun gear 44 and rotor shaft 51 of the permanent magnet generator 80.

Fifth Embodiment

Figure 9:
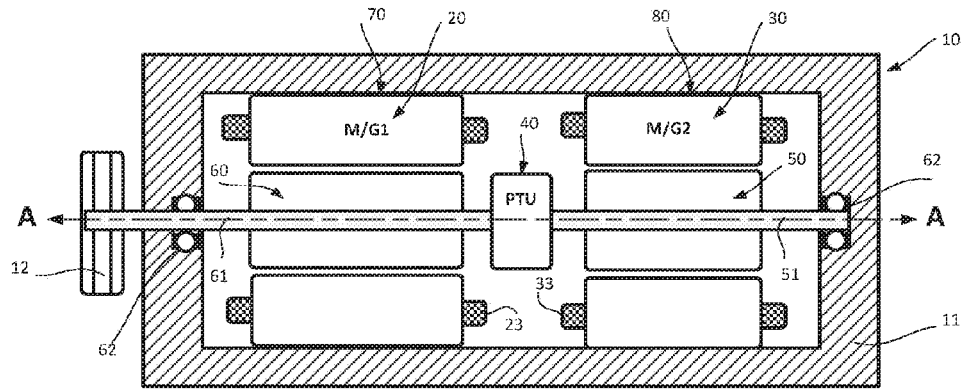
FIG. 9 is a cross-sectional view of a tandem induction motor-permanent magnet generator construction according to a sixth embodiment of the present invention.

Referring now to FIG. 9 that illustrates a cross-sectional view of the fifth embodiment of a tandem starter-generator assembly 10 of the present invention. In this embodiment, the assembly 10 comprises an induction motor assembly 70 and a permanent magnet assembly 80 in tandem. The difference between this embodiment and the other embodiments of the present invention described above is that the rotors of the induction motor assembly 70 and permanent magnet generator assembly 80 are arranged coaxially with each other along the axis A as shown in FIG. 9, wherein the rotor shaft 61 and shaft 51 are configured with the power transmission unit 40 to be rotatable at the same speed rather than relative to each other at different speeds.

This embodiment may be constructed to include a power transmission unit 40 disposed axially between the induction motor assembly 70 and permanent magnet generator assembly 80 and mechanically configured to the rotor shaft 61 and rotor shaft 51 such that rotor 60 and rotor 50 are rotatable at the same speed. This means that when the rotor shaft 61 rotates due to an applied torque the rotor shaft 51 will follow and rotate together at the same speed and torque, and vise versa. The rotor shaft 61 and shaft 51 are supported by bearings on at least two end with respect to the housing. On one end of the rotor shaft 61 is attached the assembly 10 pulley 12 having a plurality of grooves for mechanical coupling and torque transfer to and from the engine 45 crankshaft pulley 19 via a high tension serpentine belt 18. Because of the construction, wherein the rotor assembly 60 and rotor assembly 50 of the assembly 10 rotate together at the same speed, the effective torque applied to the assembly 10 pulley 12 is the resultant sum of the torque applied to the rotor shaft 61 due to the induction motor 70 and torque applied to the rotor shaft 51 due to the permanent magnet generator 80. This effective torque is transmitted to the engine 45 crankshaft pulley 19 as the amount of torque assist by which the torque produced by the engine 45 is reduced or increased depending on the operating modes of the induction motor 70 and the permanent magnet generator 80. By way of example, if the induction motor 70 is operating in motor mode and the permanent magnet generator is operating in generator mode of a hybrid vehicle, wherein the torque applied by the induction motor 70 is in the direction of rotation of the rotor shaft 61 and larger than the torque applied by the permanent magnet generator in the reverse direction of rotation of the rotor shaft 51, then the positive difference is the resultant torque transmitted to the engine 45 crankshaft pulley 19 and it represents the amount by which the engine-produced torque will be reduced Similarly, if the induction motor 70 is operating in generator mode and the permanent magnet generator 80 is operating in generator mode of a hybrid vehicle, wherein the torque applied by the induction motor 70 is in the reverse direction of rotation of the rotor shaft 61 and the torque applied by the permanent magnet generator is in the reverse direction of rotation of the rotor shaft 51 as well, then the negative sum is the resultant torque transmitted to the engine 45 crankshaft pulley 19 and it represents the amount by which the engine-produced torque will be increased.

Accordingly, it will be understood that because the induction motor 70 and permanent magnet generator 80 operates at the same rotational speed the size (radial and axial dimensions) of the permanent magnet generator 80 in this particular embodiment for the required mechanical power is larger than what the size would otherwise be for a tandem starter-generator assembly 10 having a planetary gear train mechanism 40 axially disposed between the induction motor 70 and permanent magnet generator 80 and configured to increase the rotational speed of the permanent magnet generator 80. The construction of this embodiment of the tandem motor-generator assembly 10, wherein the induction motor 70 and permanent magnet generator 80 have the same outer diameter, will have longer overall axial dimension.

During power assist mode, the resultant mechanical torque assist provided to the drivetrain and wheels 90 is the positive difference between the torque produced by the induction motor 70 in the direction of rotation of the rotor shaft 61 and the input torque required by the permanent magnet generator 80 that is transmitted from the assembly 10 pulley 12 to the engine 45 crankshaft pulley 19 as the amount of mechanical power by which the engine-produced mechanical power will be reduced to maintain vehicle speed or increased to accelerate the vehicle. Furthermore, in this power-assist mode of a hybrid vehicle, the portions of the induction motor 70 mechanical power provided to the drivetrain and permanent magnet generator 80 electrical power provided to charge the electric energy storage devices 14a and 14b are controlled by the ICCU1 13a and ICCU2 13b as determined by a concrete procedure of the supervisory control module 15 in accordance with the engine-produced mechanical power, driving conditions and current state-of-charge of the electric energy storage devices 14a and 14b with respect to set minimum thresholds.

During regenerative mode, the resultant mechanical torque assist provided to the drivetrain and wheels 90 is the negative sum of the torque produced by the induction motor 70 in the reverse direction of rotation of the rotor shaft 61 and the input torque required by the permanent magnet generator 80 that is transmitted from the assembly 10 pulley 12 to the engine 45 crankshaft pulley 19 as the amount of regenerative brake power by which the engine-produced mechanical power will be increased to maintain vehicle speed or reduced to decelerate the vehicle. Furthermore, in this regenerative mode of a hybrid vehicle, the portions of the induction motor 70 electrical power and permanent magnet generator 80 electrical power generated to charge the electric energy storage devices 14a and 14b are controlled by the ICCU1 13a and ICCU2 13b as determined by a concrete procedure of the supervisory control module 15 in accordance with the mechanical power available from the engine, driving conditions and the current state-of-charge of the electric energy storage devices 14a and 14b with respect to set minimum thresholds.

The present invention may further be directed to a control system with the tandem starter-generator assembly 10 mounted thereon. FIG. 10 illustrates the starter-generator system assembly 1 for controlling the tandem starter-generator assembly 10 having an induction motor 70 and a permanent magnet generator 80 in tandem. This is achieved by driving and controlling the operational modes and allocation of the mechanical power and electrical power outputs of the induction motor 70 and permanent magnet generator 80. The tandem starter-generator control system assembly 1 of FIG. 10 will be described with reference to the elements of the tandem starter-generator assembly 10 of the embodiments in FIGS. 1 through 9.

The system includes the tandem starter-generator assembly 10 that comprises an induction motor-generator assembly 70 and a permanent magnet generator assembly 80, wherein the induction motor-generator operates primarily as a motor and may also operate as a generator to apply regenerative brake to the hybrid vehicle 100, and the permanent magnet generator operate only in generate mode.

The system assembly 1 also includes a first bidirectional inverter/converter control unit (ICCU1) 13a that drives and controls the induction motor to operate primarily in motor mode to provide mechanical power to the drivetrain and wheels 90, and may operate as needed in generator mode to apply regenerative braking of a hybrid vehicle and in the process generate electrical power to charge the onboard electric energy storage device 14a; a second bidirectional inverter/converter control unit 13b (ICCU2) that drives and controls the permanent magnet generator to operate only in generator mode to provide electrical power to charge the onboard electric energy storage device 14a; a dc-to-dc converter control unit (DCCU) 13c that provides dc power conversion of the ac power generated by the permanent magnet generator 80 to charge the auxiliary electric energy storage device 14b that supports the operation of the onboard auxiliary load and devices 13d of a hybrid vehicle; a supervisory control module (SCM) 15 that synthesizes vehicle sensor inputs 17a that include accelerator, brake and clutch pedal inputs, electric energy storage device (supercapacitors and battery bank) state-of-charge input, fuel consumption input, and vehicle speed and other sensor inputs, and starter-generator sensor input data 17b that include torque, speed, voltage, current as well as ambient and winding temperature inputs into commands for executing the overall power management, power control and protection function of the system assembly 1, thereby ensuring that the induction motor-generator and permanent magnet generator are operating properly; an electric energy storage device 14a of the system that supports main system functions; and an auxiliary electric energy storage device 14b of the system that supports auxiliary load and device functions.

The control system assembly 1 may include at least a micro-controller to perform all the necessary signal processing and control algorithm computations, a control software to generate output control signals to control electrical power supplied to or generated by the induction motor-generator 70 and generated from the permanent magnet generator 80, input/output ports connected to the tandem starter-generator assembly 10 and bidirectional controller units 13a and 13b, and any device to interacts with the system assembly 1.

The two bidirectional inverter/controller units 13a and 13b may include two multiphase power inverter/converters for driving and controlling the multiphase induction motor 70 operating as a motor or as a generator and permanent magnet generator 80 operating as a generator; a bidirectional dc-to-dc power converter 13c that provides dc power conversion of the electric energy storage device dc-to-dc power to support proper operation of the multiphase inverter/converters during motoring mode, as well as provide ac-to-dc power conversion of the ac electrical power generated by the multiphase induction motor 70 and permanent magnet generator 80 for charging the system assembly 1 electric energy storage devices 14a and 14b.

When it is determined by a concrete procedure of the supervisory control module 15 that the tandem starter-generator assembly 10 is required to operate in motoring and generating modes, the ICCU1 13a and ICCU2 13b precisely drives and controls the induction motor 70 as a motor and permanent magnet generator 80 as a generator independently based on a closed-loop torque control algorithm. The torque control algorithm controls the output torque by controlling each of the multiphase currents directly. The multiphase currents are controlled by regulating the phase voltages based on a pulse-width modulation (PWM) technique that switches on and off at a high frequency the voltage at the input of the multiphase power inverter/converters.

For motoring mode control of the induction motor 70, the torque control command from the supervisory control module 15 is passed to the associated inverter/controller unit ICCU1 13a as a positive torque command value so that the induction motor 70 is driven and controlled to apply torque in the direction of rotation of the its rotor shaft 61 to provide torque- and power-assist. For generating mode of the induction motor 70, the torque control command from the supervisory control module 15 is passed to the associated inverter/controller unit ICCU1 13a as a negative torque command value so that the induction motor 70 is driven and controlled to carry out regenerative mode operation by applying torque in the reverse direction of rotation of its rotor shaft 61, thereby generating electrical power to charge the electric energy storage device 14a.

In a similar manner, for the generating mode control of the permanent magnet generator 80, the torque control command from the supervisory control module 15 is passed to the associated inverter/controller unit ICCU2 13b as a negative torque command value so that the permanent magnet generator 80 is driven and controlled to carry out the regenerative mode operation by applying torque in the reverse direction of rotation of its rotor shaft 51, thereby generating electrical power to charge the electric energy storage device 14b that supports operation of auxiliary loads devices.

The system assembly 1 also includes a fault detection and protection means such that system assembly 1 is protected from fault conditions, which includes short-circuit, over-voltage, over-current, over-speed, and over-temperature, by reducing or limiting torque and power produced by the tandem starter-generator assembly 10, and shutting down electrical power supplied to and produced by the tandem starter-generator assembly 10, and other system functions.

Also, disclosed is a method for controlling the tandem starter-generator assembly 10 according to any of the embodiments of the present invention. FIGS. 12 through 16 illustrate a method of controlling the power flow in a hybrid vehicle powertrain that includes the tandem started-generator assembly 10, ICCU1 13a and ICCU2 13b, DCCU, as well as electric energy storage devices 14a and 14b mounted thereon, and engine. The hybrid vehicle powertrain 100 takes advantage of the characteristics of the tandem started-generator system assembly 1 according to the driving conditions to ensure improvement in fuel efficiency.

Figure 12:
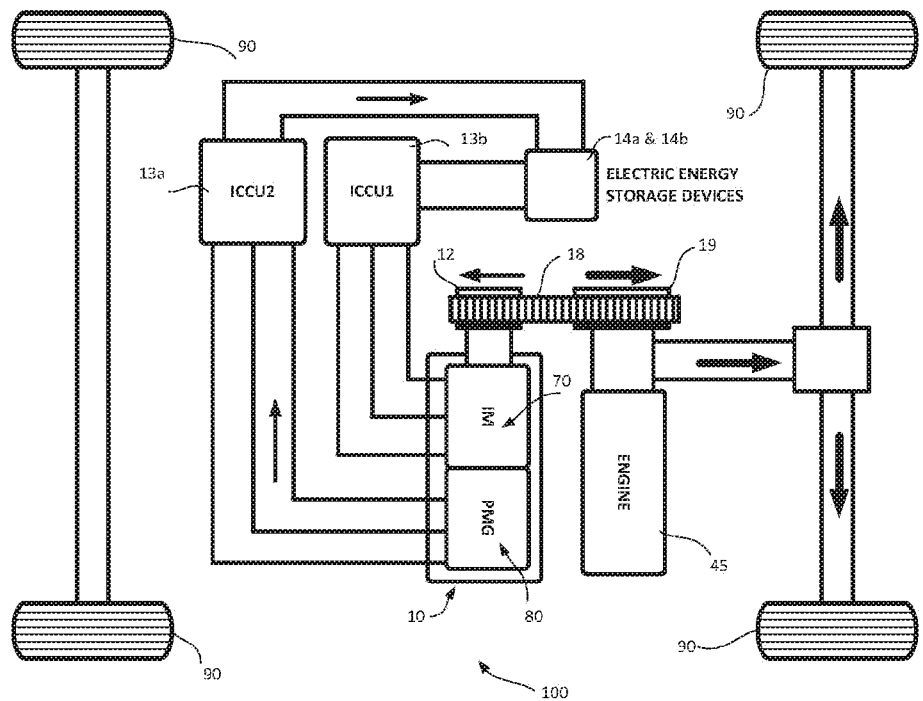
FIGS. 12 through 16 illustrate a method of controlling a tandem starter-generator system according to any of the embodiments of the present invention for different driving conditions of a hybrid powertrain system.

In the construction of the hybrid vehicle 100 illustrated in FIG. 12, the tandem starter-generator power system 1 is linked to a conventional engine 45 powertrain via a serpentine or special belt 18 that mechanically couples the pulley 12 of the assembly 10 to the crankshaft pulley 19 of the engine 45 to form a parallel-structured hybrid powertrain. The parallel hybrid powertrain thus constructed enables the output power of the tandem started-generator assembly 10 to be transmitted to the engine through the serpentine belt 18, thereby providing part of the mechanical power transmitted to the drivetrain and wheels 90.

FIGS. 12 through 16 illustrate the method of controlling the power flow of a tandem starter-generator assembly 10 according to any of the embodiments of the present invention. The figures also include arrows with thicknesses to illustrate relative proportion of the mechanical power and electrical power consumes and generated in the hybrid vehicle 100 during various driving conditions or states. The method of controlling the power flow is described below for the following states of the hybrid vehicle 100.

State I
Engine Only Mode

FIG. 12 illustrates the engine only mode state of the power flow of the hybrid vehicle 100, as determined by the supervisory control module 15, in which the engine provides all the mechanical power required to drive the vehicle as illustrated by the thicker arrows. In this mode, the permanent magnet generator 80 of the tandem starter-generator assembly 10 is driven and controlled by the ICCU2 13b to generate a small amount of electrical power that that is used to charge the onboard electric energy storage devices 14a and 14b, and the induction motor 80 is not driven by the ICCU1 13a and hence provides no electromagnetic torque.

This state of the hybrid vehicle 100 is applicable for very low speed when the clutch pedal 16 is depressed, when the vehicle is in neutral, or when the state-of-charge (SOC) of the onboard electric energy storage device 14a is low that attempting to used it to drive the induction motor in order to provide mechanical torque to the drivetrain and wheels 90 could cause irreversible damage. In this state of the hybrid vehicle 100, the vehicle demand is handled directly by the engine and the tandem starter-generator assembly 10 provides no electromagnetic torque.

State II
Startup, Low Speed and Acceleration Modes

Figure 13:
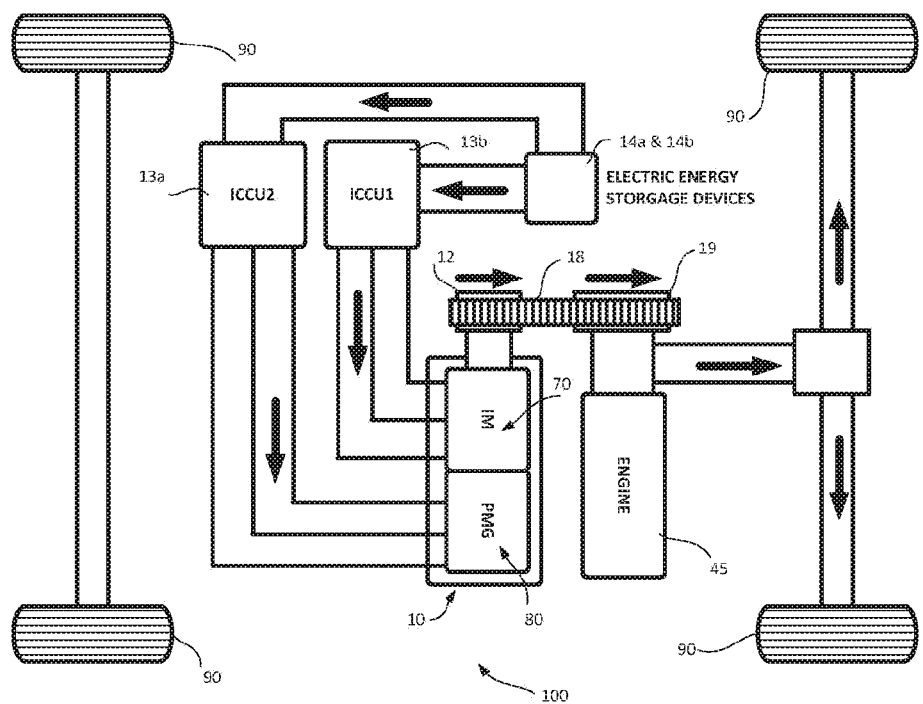

FIG. 13 illustrates the state of the power flow of the hybrid vehicle 100 during startup, low speed and acceleration modes. In this state of the hybrid vehicle 100 operation with the accelerator pedal 16 depressed, both the engine 45 and tandem starter-generator system assembly 1 are providing mechanical power to the drivetrain and wheels 90. The induction motor assembly 70 is driven and controlled in motoring mode by the ICCU1 13a to provide mechanical torque and power during startup, low speed and acceleration modes using electrical power from the onboard electric energy storage device 14a. Meanwhile, since the rotating magnetic drag losses in the permanent magnet generator 80 at startup and low speed are quite low, the permanent magnet generator may be driven and controlled by the ICCU2 13b to generate relatively smaller amount of electrical power that is used to charge the onboard electric energy storage devices 14a and 14b. For this state of the hybrid vehicle 100 operation, the bulk of the electric power is drawn from the onboard electric energy storage device 14a and efficiently converted to mechanical power that is transmitted through the serpentine belt 18 to the crankshaft pulley 19 and drivetrain, as illustrated by the thicker arrows.

Figure 14:
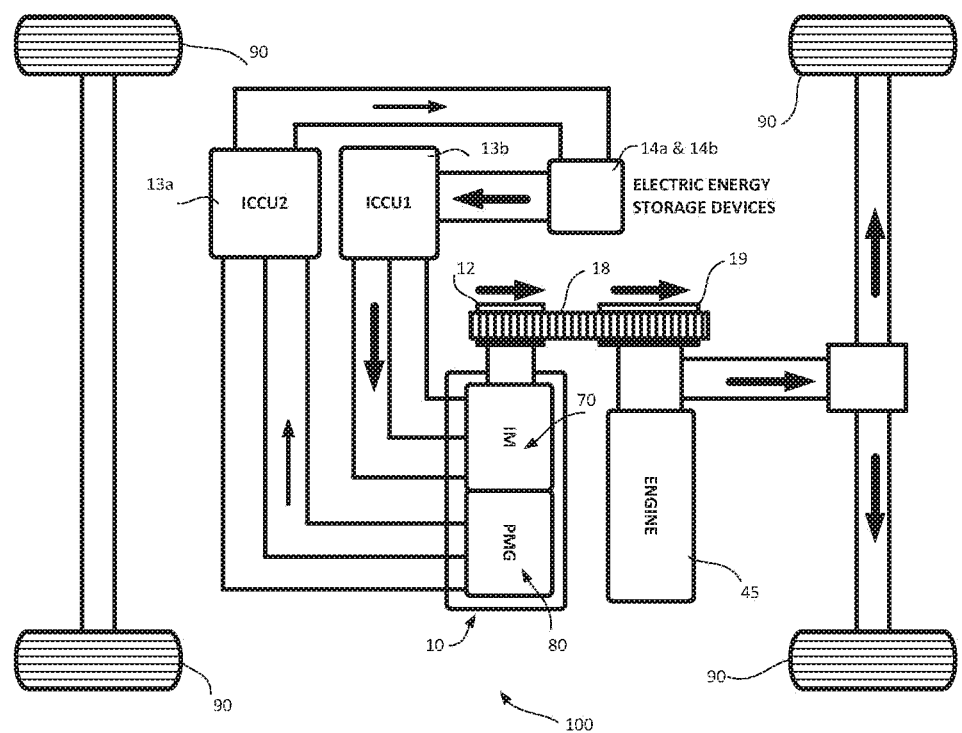

If more traction power is needed for additional acceleration demand, then the ICCU1 13a will drive and control the induction motor 70 to deliver 150 percent transient overload torque and power for up to 60 seconds. For the duration of the transient overload, the permanent magnet generator 80 may not be driven by the ICCU2 13b. Also, during the duration of the transient overload operation, the winding temperatures of the induction motor 70 and permanent magnet generator 80 of the tandem starter-generator assembly 10 are continuously monitored to ensure that they do not exceed the maximum allowable temperature limits State III Cruising Speed Mode FIG. 14 illustrates the state of the power flow of the hybrid vehicle 100 in cruising mode at moderate speed. In the moderate speed range of the cruising speed mode of the hybrid vehicle 100 with the accelerator pedal 16 depressed, the induction motor 70 is driven by the ICCU1 13a to continue providing mechanical torque- and power-assist to the engine 45 and the permanent magnet generator assembly 80 is driven by the ICCU2 13b to generate a relatively smaller amount of electrical power that is used to charge the onboard electric energy storage devices 14a and 14b. The mechanical power transmitted to the engine during this state from the induction motor 70 is larger than the electrical power generated by the permanent magnet generator 80, as illustrated by the thicker and thinner arrows of FIG. 10.

Figure 15:
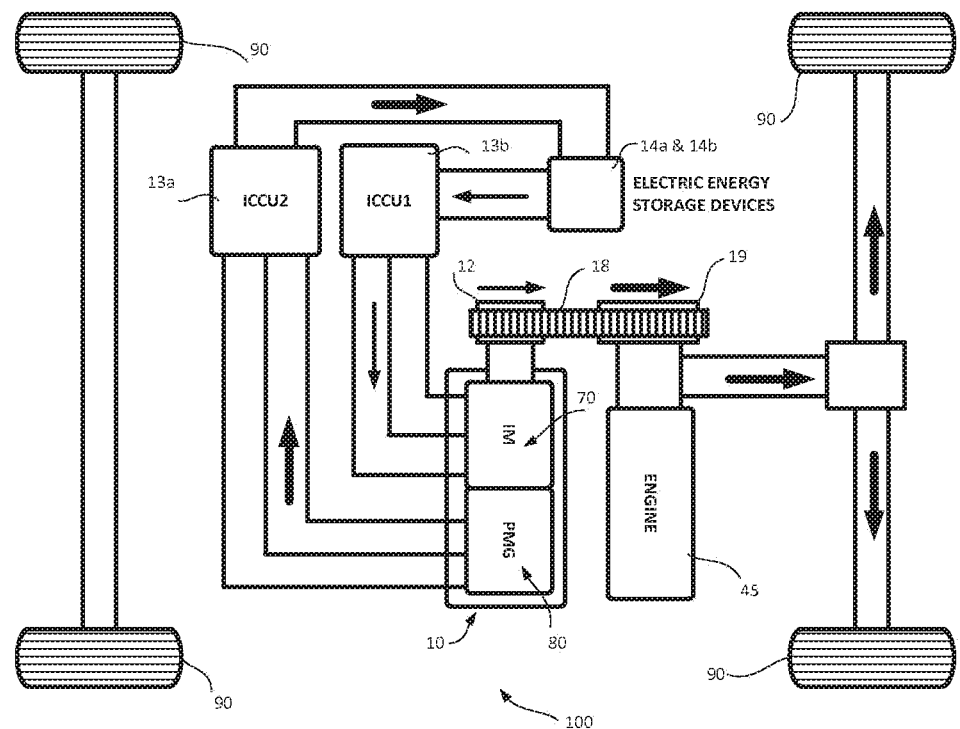

FIG. 15 also illustrates the state of the power flow of the hybrid vehicle 100 in cruising mode at high speed. In the high speed range of the cruising speed mode of the hybrid vehicle 100 with the accelerator pedal farther depressed, the mechanical torque and power transmitted from the induction motor 70 to the engine 45 is further reduced accordingly, and the electrical power generated by the permanent magnet generator 80 for charging the onboard electric energy storage devices 14a and 14b is increased accordingly. That is, as the speed increases to the high speed range, less mechanical power is apportioned by the supervisory control module 15 that are transmitted to the drivetrain and wheels 90 of the hybrid vehicle 100, and more generated electrical power is apportioned for charging the onboard electric energy storage devices 14a and 14b. The relatively smaller mechanical power apportioned is illustrated with the thinner arrows and the relatively larger electrical power apportioned is illustrated with the thicker arrows.

State IV

Deceleration and Braking Modes

Figure 16:
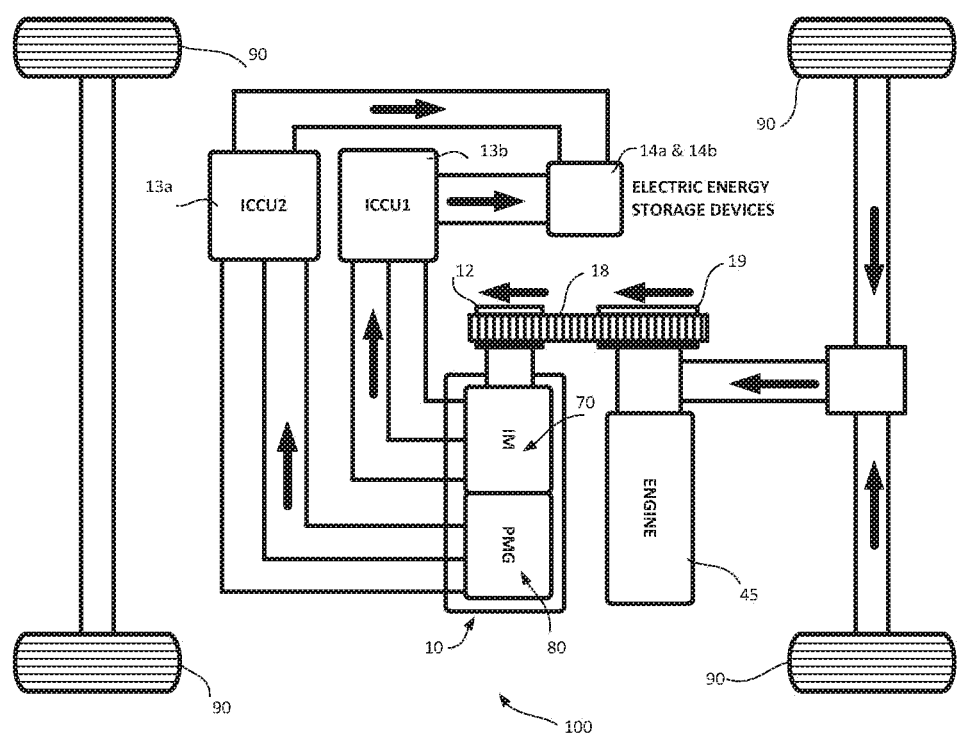

FIG. 16 illustrates the state of the power flow of the hybrid vehicle 100 in deceleration and braking modes. The hybrid vehicle 100 goes into this state only when the brake pedal 16 is depressed. During deceleration and braking modes, both the induction motor 70 and permanent magnet generator 80 are driven and controlled by ICCU1 13a and ICCU2 13b to operate in generating modes to apply regenerative brake, thereby extracting mechanical energy from the drivetrain that is converted to electrical power to charge the onboard electric energy storage devices 14a and 14b. Both the induction motor 70 and permanent magnet generator 80 of the tandem starter-generator may be driven and controlled to generate the maximum power possible at the operating speed, as illustrated by with the thicker arrows in FIG. 16.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Accordingly, it is intended that the invention not be limited to the particular embodiment disclosed herein as the best mode contemplated for carrying out this invention, but that the invention will include all embodiments falling within the scope of the claims.

The invention claimed is:

1. An electronic device to control an accessory to a mechanical power source of a motor vehicle, the electronic device comprising:
   circuitry configured to:
      select one mode from a plurality of modes based on captured information including at least a current speed of the motor vehicle and a current acceleration demand of the motor vehicle, the plurality of modes including a first generation mode, a second motoring mode, and a third motoring and generation mode; and
      generate a set of one or more commands according to the selected one of the modes to control directions and magnitudes of torques applied by motor/generator assemblies of the accessory to their respective rotor shaft, wherein the set is to cause the motor-generator assemblies to perform one of:
         jointly charge common energy storage device following selection of the first generation mode;
         jointly discharge the common energy storage device to jointly assist the mechanical power source in driving an axle of a motor vehicle following selection of the second motoring mode; or
         one of the motor/generator assemblies to individually charge the common energy storage device and the other of the motor/generator assemblies to selectively discharge the common energy storage device to individually assist the mechanical power source in driving the axle of the motor vehicle following selection of the third motoring and generation mode.

2. The electronic device of claim 1, wherein a first command of the set is to control an induction motor-generator corresponding to one of the motor/generator assemblies and a second command of the set is to control a permanent magnet motor-generator corresponding to the other of the motor/generator assemblies.

3. The electronic device of claim 2, the circuitry further configured to pass a first subset of the set to a control unit of the induction motor-generator and pass a second different subset of the set to a control unit of the permanent magnet motor-generator.

4. The electronic device of claim 1, wherein the circuitry is configured to generate a new set of one or more commands after generation of said set and responsive to fault detection to reduce torque produced by the accessory.

5. The electronic device of claim 1, wherein the circuitry is configured to shut down electrical power supplied to the assembly responsive to fault detection.

6. The electronic device of claim 1, wherein the captured information includes winding temperature.

7. The electronic device of claim 1, wherein the set is to implement, in the motoring and generation mode:
   an individual charging of the common energy storage at a first rate responsive to a current vehicle speed within a first speed range, and an individual charging of the common energy storage at a second rate responsive to the current vehicle speed within a second different speed range;

wherein the second speed range includes a greater speed than the first speed range, and wherein the second rate is greater than the first rate.

8. The electronic device of claim 7, wherein set is to implement no discharge of the common energy storage in the motoring and generation mode responsive to the current vehicle speed less than a third speed that is less than a lower value of the first speed range.

9. The electronic device of claim 1, wherein generation of the set further comprises generation of a first signal for a first control unit of the first motor/generator assembly and generation of a second signal for a second control unit of the second motor/generator assembly.

10. The electronic device of claim 9, wherein in at least one of the first generation mode, the second motoring mode, or the third motoring and generation mode the signals are to cause at least one of the control units to periodically switch on and off a voltage at an input of multiphase power inverters/converters of the accessory.

11. A memory device having stored thereon instructions that are to control an accessory to a mechanical power source of a motor vehicle and that, in response to execution by a processing device, cause the processing device to perform operations comprising:

selecting one mode from a plurality of modes based on captured information including at least a current speed of the motor vehicle and a current acceleration demand of the motor vehicle, the plurality of modes including a first generation mode, a second motoring mode, and a third motoring and generation mode; and generating a set of one or more commands to cause motor/generator assemblies of the accessory to be driven and controlled according to the selected one of the modes, wherein the set is to cause the motor-generator assemblies to perform one of:

jointly charge a common energy storage device following selection of the first generation mode;

jointly discharge the common energy storage device to jointly assist the mechanical power source in driving an axle of a motor vehicle following selection of the second motoring mode; or one of the motor/generator assemblies to individually charge the common energy storage device and the other of the motor/generator assemblies to selectively discharge the common energy storage device to individually assist the mechanical power source in driving the axle of the motor vehicle following selection of the third motoring and generation mode.

12. The memory device of claim 11, wherein a first command of the set is to control an induction motor-generator corresponding to one of the motor/generator assemblies and a second command of the set is to control a permanent magnet motor-generator corresponding to the other of the motor/generator assemblies.

13. The memory device of claim 11, wherein the set includes at least one torque control command.

14. The memory device of claim 13, wherein generating the set further comprises generating a first torque command value for a first control unit of the motor/generator assemblies and a second torque command value for a second control unit of the motor/generator assemblies.

15. The memory device of claim 13, wherein each of said torque command values includes a magnitude and sign to indicate a direction of rotation.

16. The memory device of claim 15, wherein the signs of the torque command values indicate different directions of rotation only if the third motoring and generation mode is selected.

17. The memory device of claim 11, wherein the set is to implement, in the motoring and generation mode:

an individual charging of the common energy storage at a first rate responsive to a current vehicle speed within a first speed range, and an individual charging of the common energy storage at a second rate responsive to the current vehicle speed within a second different speed range;

wherein the second speed range includes a greater speed than the first speed range, and wherein the second rate is greater than the first rate.

18. The memory device of claim 17, wherein set is to implement no discharge of the common energy storage in the motoring and generation mode responsive to the current vehicle speed less than a third speed that is less than a lower value of the first speed range.

19. The memory device of claim 11, wherein the first generation mode is associated with ac-to-dc power conversion and the second motoring mode is associated with dc-to-ac power conversion.

20. The memory device of claim 11, wherein generating the set further comprises generating a first signal for a first control unit of the motor/generator assemblies and a second signal for a second control unit of the second motor/generator assemblies, wherein in at least one of the first generation mode, the second motoring mode, or the third motoring and generation mode the signals are to cause at least one of the control units to periodically switch on and off a voltage at an input of multiphase power inverters/converters of the accessory.

* * * * *